United States Patent
Wu et al.

(10) Patent No.: US 10,966,083 B2
(45) Date of Patent: Mar. 30, 2021

(54) ANCHOR KEY GENERATION METHOD, DEVICE, AND SYSTEM

(71) Applicant: Huawei Technologies Co., Ltd., Shenzhen (CN)

(72) Inventors: Rong Wu, Shenzhen (CN); Bo Zhang, Shenzhen (CN); Lu Gan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/441,598

(22) Filed: Jun. 14, 2019

(65) Prior Publication Data

US 2019/0297494 A1 Sep. 26, 2019

Related U.S. Application Data

(63) Continuation of application No. 16/388,606, filed on Apr. 18, 2019, which is a continuation of application No. PCT/CN2018/084416, filed on Apr. 25, 2018.

(30) Foreign Application Priority Data

May 5, 2017 (CN) .......................... 2017 1 0313519
Sep. 29, 2017 (CN) .......................... 2017 1 0908017

(51) Int. Cl.
*H04L 9/00* (2006.01)
*H04W 12/04* (2021.01)
(Continued)

(52) U.S. Cl.
CPC ........... *H04W 12/0401* (2019.01); *H04L 9/08* (2013.01); *H04L 63/0869* (2013.01); *H04W 8/08* (2013.01);
(Continued)

(58) Field of Classification Search
USPC ........................................................ 370/329
See application file for complete search history.

(56) References Cited

U.S. PATENT DOCUMENTS 8,116,775 B2 * 2/2012 Choi ..................... H04W 36/36
455/437
8,565,433 B2 * 10/2013 Feng ............... H04W 12/04031
380/270
(Continued)

FOREIGN PATENT DOCUMENTS

CN 101523765 A 9/2009
CN 101540981 A 9/2009
(Continued)

OTHER PUBLICATIONS

Prasad, A., et al., "3GPP 5G Security," May 3, 2018, 22 pages.
(Continued)

*Primary Examiner* — Christopher J Brown
(74) *Attorney, Agent, or Firm* — Conley Rose, P.C.

(57) ABSTRACT

An anchor key generation method, device, and system, where the method includes generating, by a unified data management network element (UDM), an intermediate key based on a cipher key (CK), an integrity key (IK), and indication information regarding an operator; sending, by the UDM, the intermediate key to an authentication server function (AUSF); receiving, by the AUSF, the intermediate key; generating, by the AUSF, an anchor key based on the intermediate key; sending, by the AUSF, the anchor key to a security anchor function (SEAF); and generating, by the SEAF, a key (Kamf) based on the anchor key, where the Kamf is used to derive a $3^{rd}$ Generation Partnership Project (3GPP) key.

20 Claims, 25 Drawing Sheets

(51) Int. Cl.
| | |
|---|---|
| *H04W 80/10* | (2009.01) |
| *H04W 88/02* | (2009.01) |
| *H04W 76/11* | (2018.01) |
| *H04W 76/25* | (2018.01) |
| *H04W 8/08* | (2009.01) |
| *H04L 9/08* | (2006.01) |
| *H04L 29/06* | (2006.01) |

(52) U.S. Cl.
CPC ....... *H04W 12/04* (2013.01); *H04W 12/0403* (2019.01); *H04W 76/11* (2018.02); *H04W 76/25* (2018.02); *H04W 80/10* (2013.01); *H04W 88/023* (2013.01)

(56) References Cited

U.S. PATENT DOCUMENTS

| | | | |
|---|---|---|---|
| 2010/0190500 | A1 | 7/2010 | Choi et al. |
| 2011/0128937 | A1 | 6/2011 | Iwamura et al. |
| 2011/0312299 | A1 | 12/2011 | Patil et al. |
| 2012/0328103 | A1 | 12/2012 | Feng et al. |
| 2013/0310006 | A1 | 11/2013 | Chen et al. |
| 2018/0084414 | A1* | 3/2018 | Lee ................. H04W 12/04033 |

FOREIGN PATENT DOCUMENTS

| | | |
|---|---|---|
| CN | 101771990 A | 7/2010 |
| CN | 102017674 A | 4/2011 |
| CN | 102625300 A | 8/2012 |
| CN | 103607713 A | 2/2014 |
| CN | 103781069 A | 5/2014 |
| CN | 105554747 A | 5/2016 |
| WO | 2016195907 A1 | 12/2016 |

OTHER PUBLICATIONS

Office Action dated Aug. 28, 2019, 17 pages, U.S. Appl. No. 16/388,606, filed Apr. 18, 2019.
NEC, "pCR to TR 33.899: Consolidated Key Hierarchy for NextGen networks," 3GPP TSG SA WG3 (Security) Meeting #186, S3-170386, Feb. 6-10, 2017, 4 pages.
NEC, "pCR to TR 33.899: Consolidated Key Hierarchy for NextGen networks," 3GPP TSG SA WG3 (Security) Meeting #86, S3-170386, rev of S3-170163, Feb. 6-10, 2017, 4 pages.
Huawei, et al., "Security in secondary node in tight interworking," 3GPP TSG-RAN WG2 #97, R2-1701849 (Resubmission of R2-1700302), Feb. 13-17, 2017, 8 pages.
China Mobile, "[MTCe] Key derivation clarification about group authentication mechanism," 3GPP TSG SA WG3 (Security) Meeting #79, S3-151333, Apr. 20-24, 2015, 3 pages.
Vodafone, "pCR to 33.863: Multiple changes as per conference call," 3GPP TSG SA (Security) Meeting #81, S3-152570, revision of S3-152229, Nov. 9-13, 2015, 13 pages.
Nokia, "Proposed interim agreement on anchor key for 5G phase 1," 3GPP TSG SA WG3 (Security) Meeting #86Bis, S3-170909, revision of S3-170649, Mar. 27-31, 2017, 1 page.
Huawei, et al., "Update key hierarchy," 3GPP TSG SA WG3 (Security) Meeting #89, S3-173144, revision of S3-17xabc, Nov. 27-Dec. 1, 2017, 4 pages.

Foreign Communication From a Counterpart Application, Chinese Application No. 201910165198.1, Chinese Office Action dated Oct. 10, 2019, 4 pages.
Foreign Communication From a Counterpart Application, Chinese Application No. 201910165198.1, Chinese Search Report dated Sep. 29, 2019, 2 pages.
Foreign Communication From a Counterpart Application, European Application No. 18795025.8, Extended European Search Report dated Sep. 27, 2019, 14 pages.
3GPP TS 33.401 V13.0.0 3rd Generation Partnership Project;Technical Specification Group Services and System Aspects;3GPP System Architecture Evolution (SAE);Security architecture(Release 13); Sep. 2015, 131 pages.
"3rd Generation Partnership Project; Technical Specification Group Services and System Aspects; 3GPP System Architecture Evolution (SAE); Security architecture (Release 14)," 3GPP TS 33.401, V14.2.0, Mar. 2017, 152 pages.
"3rd Generation Partnership Project; Technical Specification Group Services and System Aspects; 3GPP System Architecture Evolution (SAE); Security aspects of non-3GPP accesses (Release 14)," 3GPP TS 33.402, V14.1.0, Mar. 2017, 71 pages.
"3rd Generation Partnership Project; Technical Specification Group Services and System Aspects; Study on the security aspects of the next generation system (Release 14)," 3GPP TR 33.899, V0.5.0, Oct. 2016, 244 pages.
"3rd Generation Partnership Project; Technical Specification Group Services and System Aspects; Study on the security aspects of the next generation system (Release 14)," 3GPP TR 33.899, V1.1.0, Mar. 2017, 491 pages.
Arkko, J., et al.,"Improved Extensible Authentication Protocol Method for 3rd Generation Authentication and Key Agreement (EAP-AKA')," RFC 5448, May 2009, 29 pages.
Ericsson, "Update to solution #2.9: adding evaluation, and resolving ENs," 3GPP TSG-SA WG3 Meeting #86, S3-170284 (revision of S3-16abcd), Feb. 6-10, 2017, 9 pages.
Ericsson, "Solution for the security anchor function based on a primary AMF," 3GPP TSG-SA WG3 Meeting #86, S3-170391 (revision of S3-170277), Feb. 6-10, 2017, 4 pages.
Machine Translation and Abstract of Chinese Publication No. CN103607713, Feb. 26, 2014, 37 pages.
Machine Translation and Abstract of Chinese Publication No. CN103781069, May 7, 2014, 19 pages.
Machine Translation and Abstract of Chinese Publication No. CN105554747, May 4, 2016, 45 pages.
Foreign Communication From a Counterpart Application, PCT Application No. PCT/CN2018/084416, English Translation of International Search Report dated Jul. 16, 2018, 2 pages.
Foreign Communication From a Counterpart Application, Chinese Application No. 201810413392.2, Chinese Office Action dated Feb. 15, 2019, 5 pages.
Foreign Communication From a Counterpart Application, Chinese Application No. 201810413392.2, Chinese Notice of Allowance dated Apr. 1, 2019, 4 pages.
Qualcomm Incorporated, "Update of solution #1.6 to include roaming architectural aspects," 3GPP TSG SA WG3 (Security) Adhoc Meeting on FS_NSA, S3-161431, Sep. 27-29, 2016, San Diego, USA, 7 pages.

* cited by examiner

ANCHOR KEY GENERATION METHOD, DEVICE, AND SYSTEM

CROSS-REFERENCE TO RELATED APPLICATIONS

This application is a continuation of U.S. patent application Ser. No. 16/388,606, filed on Apr. 18, 2019, which is a continuation of International Application No PCT/CN2018/084416, filed on Apr. 25, 2018, which claims priority to Chinese Application No. 201710908017.0, filed on Sep. 29, 2017, which claims priority to Chinese Application No. 201710313519.9, filed on May 5, 2017. All of the aforementioned patent applications are hereby incorporated by reference in their entireties.

TECHNICAL FIELD

The present disclosure relates to the communications field, and in particular, to an anchor key generation method, device, and system.

BACKGROUND

A key is critical to an encryption operation, a decryption operation, and a cryptosystem. Therefore, in an information security system, key negotiation is an important part in an authentication process. FIG. 1 shows a key negotiation process in an existing fourth generation (4G) system. Network elements required for executing the process include a user equipment (UE), an evolved NodeB (eNodeB), a mobility management entity (MME), a home subscriber server (HSS), an authentication center (AuC), and the like. The execution process is roughly as follows below.

Step 1: The AuC generates an integrity key (IK) and a cipher key (CK) based on a root key K, and sends the IK and the CK to the HSS. Correspondingly, the HSS receives the IK and the CK sent by the AuC.

Step 2: The HSS generates an intermediate key ($K_{ASME}$) based on the IK and the CK, and sends the $K_{ASME}$ to the MME. Correspondingly, the MME receives the $K_{ASME}$ sent by the HSS.

Step 3: The MME generates, based on the $K_{ASME}$, a non-access stratum (NAS) integrity key ($K_{NASenc}$) or performing encryption protection on an NAS message, and a NAS integrity protection key ($K_{NASint}$) for performing integrity protection.

Step 4: The MME generates a base station key ($K_{eNB}$) based on the $K_{ASME}$, and sends the $K_{eNB}$ to the eNodeB. Correspondingly, the eNodeB receives the $K_{eNB}$ sent by the MME.

Step 5: The eNodeB separately generates, based on the $K_{eNB}$, a user plane cipher key ($K_{UPenc}$) for performing encryption protection on user plane data, a user plane integrity key ($K_{UPint}$) for performing integrity protection on the user plane data, a control plane cipher key ($K_{RRCenc}$) for performing encryption protection on control plane data, and a control plane integrity key ($K_{RRCint}$) for performing integrity protection on the control plane data.

Step 6: The UE generates by itself an integrity key (IK), a cipher key (CK), an intermediate key ($K_{ASME}$), a user plane cipher key ($K_{UPenc}$), a user plane integrity key ($K_{UPint}$), a control plane cipher key ($K_{RRCenc}$), and a control plane integrity key ($K_{RRCint}$) based on the root key K.

After the key negotiation process shown in FIG. 1 is completed, a key architecture shown in FIG. 2 is generated in the 4G system.

It may be understood that FIG. 1 shows a key negotiation process in a process of accessing a core network by a terminal in a 3rd Generation Partnership Project (3GPP) access mode in a 4G application scenario. To meet requirements of various application scenarios, the terminal may access the core network in various different access modes, for example, a 3GPP access mode, a trusted non-3GPP access mode, and an untrusted 3GPP access mode. In different access modes, key negotiation processes are also different. In a fifth generation (5G) standard, it is specified that one unified anchor key needs to be generated in key negotiation processes of different access modes, in order to implement compatibility with various access modes. However, how to generate the unified anchor key is a problem that a person skilled in the art needs to resolve.

SUMMARY

Embodiments of this application provide an anchor key generation method, device, and system, to generate a unified anchor key for different access modes, and implement separation between an anchor key of different access modes and a lower-layer key generated based on the anchor key.

A first aspect provides an anchor key generation method including receiving, by a first communications device, an indication identifier sent by a second communications device, where the indication identifier is used to indicate an access mode of a terminal; sending, by the first communications device, the indication identifier to a third communications device; receiving, by the first communications device, an intermediate key returned by the third communications device, where the intermediate key is generated based on the indication identifier; generating, by the first communications device, an anchor key based on the intermediate key, where the anchor key is corresponding to the access mode of the terminal; and sending, by the first communications device, the anchor key to the second communications device, such that the second communications device derives a lower-layer key for the access mode based on the anchor key.

In some possible implementations, the access mode is distinguished based on at least one of an access type or an operator type.

In some possible implementations, the generating, by the first communications device, an anchor key based on the intermediate key includes generating, by the first communications device, the anchor key based on the following formula: anchor key=KDF($IK_1'\|CK_1'$), where anchor key is the anchor key, ($IK_1'$, $CK_1'$) is the intermediate key, $IK_1'$ is an intermediate integrity key, $CK_1'$ is an intermediate cipher key, and $\|$ means concatenation, indicating that characters on both sides of the symbol are connected in series.

The first communications device may generate the intermediate key in at least the following two manners described below.

When the indication identifier includes an access type identifier and an operator type identifier, the intermediate key is generated based on the following formula: ($CK_1'$, $IK_1'$)=KDF(SQN⊕AK, ANT, SNT, CK$\|$IK), where the access type identifier is used to indicate the access type, the operator type identifier is used to indicate the operator type, ($CK_1'$, $IK_1'$) is the intermediate key, $CK_1'$ is the intermediate cipher key, $IK_1'$ is the intermediate integrity key, KDF is a key generation algorithm, SQN is a latest sequence number, ANT is the access type identifier, SNT is the operator type identifier, CK is an initial cipher key, IK is an initial integrity key, AK is an anonymity key, CK=f3(RAND), IK=f4

(RAND), AK=f5(RAND), RAND is a random number, f3, f4, and f5 are generation algorithms, and ⊕ means an exclusive OR operation.

When the indication identifier is an NAI, the intermediate key is generated based on the following formula: $(CK_1', IK_1')$=KDF(SQN⊕AK, NAI, CK∥IK), where $(CK_1', IK_1')$ is the intermediate key, $CK_1'$ is the intermediate cipher key, $IK_1'$ is the intermediate integrity key, KDF is a key generation algorithm, SQN is a latest sequence number, NAI is the indication identifier, CK is an initial cipher key, IK is an initial integrity key, AK is an anonymity key, CK=f3(RAND), IK=f4(RAND), AK=f5(RAND), RAND is a random number, f3, f4, and f5 are generation algorithms, and ⊕ means an exclusive OR operation.

In some possible implementations, the first communications device generates the intermediate key based on the following formula: $(CK_2', IK_2')$=KDF(SQN⊕AK, ANT, CK∥IK), where $(CK_2', IK_2')$ is the intermediate key, $CK_2'$ is the intermediate cipher key, $IK_2'$ is the intermediate integrity key, KDF is a key generation algorithm, SQN is a latest sequence number, ANT is the access type identifier, CK is an initial cipher key, IK is an initial integrity key, AK is an anonymity key, CK=f3(RAND), IK=f4(RAND), AK=f5(RAND), RAND is a random number, f3, f4, and f5 are generation algorithms, and ⊕ means an exclusive OR operation.

The first communications device generates an EMSK' based on the following formula EMSK'=PRF'($IK_2'$∥$CK_2'$), where EMSK' is an extended master session key, ($IK_2'$, $CK_2'$) is the intermediate key, $IK_2'$ is the intermediate integrity key, $CK_2'$ is the intermediate cipher key, and ∥ means concatenation, indicating that characters on both sides of the symbol are connected in series.

The first communications device generates the anchor key based on the following formula: anchor key=KDF(EMSK', SNT), where anchor key is the anchor key, and SNT is the operator type identifier.

In some possible implementations, the first communications device generates the intermediate key based on the following formula $(CK_2', IK_2')$=KDF(SQN⊕AK, SNT, CK∥IK), where $(CK_2', IK_2')$ is the intermediate key, $CK_2'$ is the intermediate cipher key, $IK_2'$ is the intermediate integrity key, KDF is a key generation algorithm, SQN is a latest sequence number, SNT is the operator type identifier, CK is an initial cipher key, IK is an initial integrity key, AK is an anonymity key, CK=f3(RAND), IK=f4(RAND), AK=f5(RAND), RAND is a random number, f3, f4, and f5 are generation algorithms, and ⊕ means an exclusive OR operation.

The first communications device generates an EMSK' based on the following formula: EMSK'=PRF'($IK_2'$∥$CK_2'$), where EMSK' is an extended master session key, ($IK_2'$, $CK_2'$) is the intermediate key, $IK_2'$ is the intermediate integrity key, $CK_2'$ is the intermediate cipher key, and ∥ means concatenation, indicating that characters on both sides of the symbol are connected in series.

The first communications device generates the anchor key based on the following formula: anchor key=KDF(EMSK', ANT), where anchor key is the anchor key, and ANT is the access type identifier.

A second aspect provides a communications device including a receiving module, a sending module, and a generation module. The receiving module is configured to receive an indication identifier sent by a second communications device, where the indication identifier is used to indicate an access mode of a terminal. The sending module is configured to send the indication identifier to a third communications device. The receiving module is configured to receive an intermediate key returned by the third communications device, where the intermediate key is generated based on the indication identifier. The generation module is configured to generate an anchor key based on the intermediate key, where the anchor key is corresponding to the access mode of the terminal. The sending module is further configured to send the anchor key to the second communications device, such that the second communications device derives a lower-layer key for the access mode based on the anchor key.

In some possible implementations, the access mode is distinguished based on at least one of an access type or an operator type.

In some possible implementations, the generation module is configured to generate the anchor key based on the following formula: anchor key=KDF($IK_1'$∥$CK_1'$), where anchor key is the anchor key, ($IK_1'$, $CK_1'$) is the intermediate key, $IK_1'$ is an intermediate integrity key, $CK_1'$ is an intermediate cipher key, and ∥ means concatenation, indicating that characters on both sides of the symbol are connected in series.

The first communications device may generate the intermediate key in at least the following two manners below.

When the indication identifier includes an access type identifier and an operator type identifier, the generation module is configured to generate the intermediate key based on the following formula: $(CK_1', IK_1')$=KDF(SQN⊕AK, ANT, SNT, CK∥IK), where the access type identifier is used to indicate the access type, the operator type identifier is used to indicate the operator type, $(CK_1', IK_1')$ is the intermediate key, $CK_1'$ is the intermediate cipher key, $IK_1'$ is the intermediate integrity key, KDF is a key generation algorithm, SQN is a latest sequence number, ANT is the access type identifier, SNT is the operator type identifier, CK is an initial cipher key, IK is an initial integrity key, AK is an anonymity key, CK=f3(RAND), IK=f4(RAND), AK=f5(RAND), RAND is a random number, f3, f4, and f5 are generation algorithms, and ⊕ means an exclusive OR operation.

When the indication identifier is an NAI, the generation module is configured to generate the intermediate key based on the following formula: $(CK_1', IK_1')$=KDF(SQN⊕AK, NAI, CK∥IK), where $(CK_1', IK_1')$ is the intermediate key, $CK_1'$ is the intermediate cipher key, $IK_1'$ is the intermediate integrity key, KDF is a key generation algorithm, SQN is a latest sequence number, NAI is the indication identifier, CK is an initial cipher key, IK is an initial integrity key, AK is an anonymity key, CK=f3(RAND), IK=f4(RAND), AK=f5(RAND), RAND is a random number, f3, f4, and f5 are generation algorithms, and ⊕ means an exclusive OR operation.

In some possible implementations, the generation module is configured to generate the intermediate key based on the following formula: $(CK_2', IK_2')$=KDF(SQN⊕AK, ANT, CK∥IK), where $(CK_2', IK_2')$ is the intermediate key, $CK_2'$ is the intermediate cipher key, $IK_2'$ is the intermediate integrity key, KDF is a key generation algorithm, SQN is a latest sequence number, ANT is the access type identifier, CK is an initial cipher key, IK is an initial integrity key, AK is an anonymity key, CK=f3(RAND), IK=f4(RAND), AK=f5(RAND), RAND is a random number, f3, f4, and f5 are generation algorithms, and ⊕ means an exclusive OR operation.

The generation module is configured to generate an EMSK' based on the following formula: EMSK'=PRF'($IK_2'$∥$CK_2'$), where EMSK' is an extended master session key, $(IK_2', CK_2')$ is the intermediate key, $IK_2'$ is the intermediate integrity key, $CK_2'$ is the intermediate cipher key, and $\|$ means concatenation, indicating that characters on both sides of the symbol are connected in series.

The generation module is configured to generate the anchor key based on the following formula: anchor key=KDF(EMSK', SNT), where anchor key is the anchor key, and SNT is the operator type identifier.

In some possible implementations, the generation module is configured to generate the intermediate key based on the following formula: $(CK_2', IK_2')$=KDF(SQN$\oplus$AK, SNT, CK$\|$IK), where $(CK_2', IK_2')$ is the intermediate key, $CK_2'$ is the intermediate cipher key, $IK_2'$ is the intermediate integrity key, KDF is a key generation algorithm, SQN is a latest sequence number, SNT is the operator type identifier, CK is an initial cipher key, IK is an initial integrity key, AK is an anonymity key, CK=f3(RAND), IK=f4(RAND), AK=f5(RAND), RAND is a random number, f3, f4, and f5 are generation algorithms, and $\oplus$ means an exclusive OR operation.

The generation module is configured to generate an EMSK' based on the following formula: EMSK'=PRF' $(IK_2'\|CK_2')$, where EMSK' is an extended master session key, $(IK_2', CK_2')$ is the intermediate key, $IK_2'$ is the intermediate integrity key, $CK_2'$ is the intermediate cipher key, and $\|$ means concatenation, indicating that characters on both sides of the symbol are connected in series.

The generation module is configured to generate the anchor key based on the following formula: anchor key=KDF(EMSK', ANT), where anchor key is the anchor key, and ANT is the access type identifier.

A third aspect provides a communications device including a memory, a processor coupled to the memory, and a communications module. The communications module is configured to send or receive data sent from the outside, the memory is configured to store implementation code of the method described in the first aspect, and the processor is configured to execute the program code stored in the memory, namely, execute the method described in the first aspect.

A fourth aspect provides a computer readable storage medium. The computer readable storage medium stores an instruction. When the instruction is run on a computer, the computer executes the method described in the first aspect.

A fifth aspect provides a computer program product that includes an instruction. When the instruction is run on a computer, the computer executes the method described in the first aspect.

A sixth aspect provides a communications system including an access and mobility control function network element, a session management network element, an authentication server, and a unified data management network element that are connected to each other. The authentication server is the authentication server according to the second aspect or the third aspect in the claims.

BRIEF DESCRIPTION OF DRAWINGS

To describe the technical solutions in the embodiments of the present disclosure or in the background more clearly, the following briefly describes the accompanying drawings required for describing the embodiments of the present disclosure or the background.

DESCRIPTION OF EMBODIMENTS

The following separately describes a plurality of embodiments of this application with reference to the accompanying drawings and disclosed embodiments.

Figure 1:
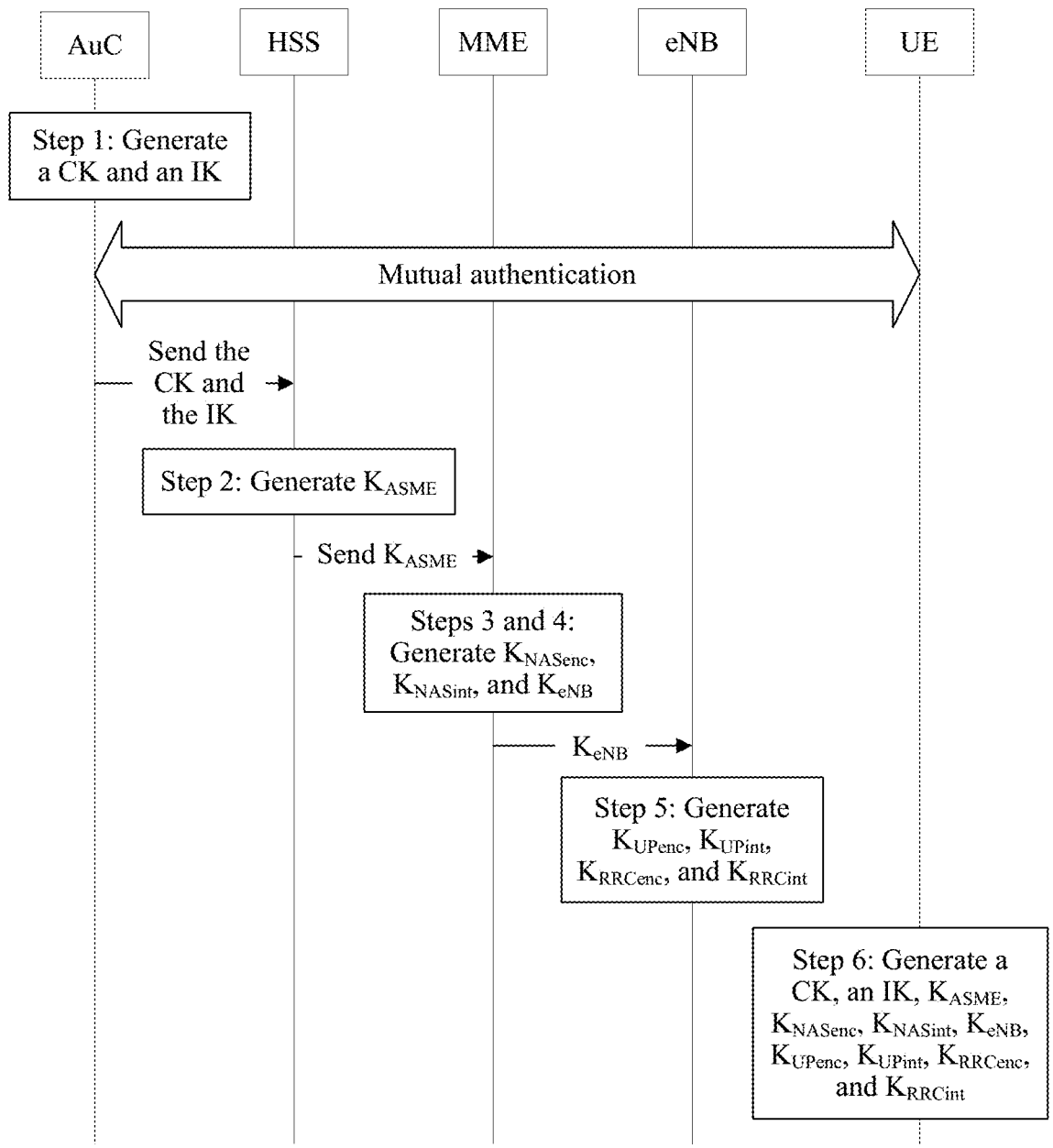
FIG. 1 is a schematic diagram of a key negotiation process in a 3GPP access mode according to a 4G application scenario.
Figure 2:
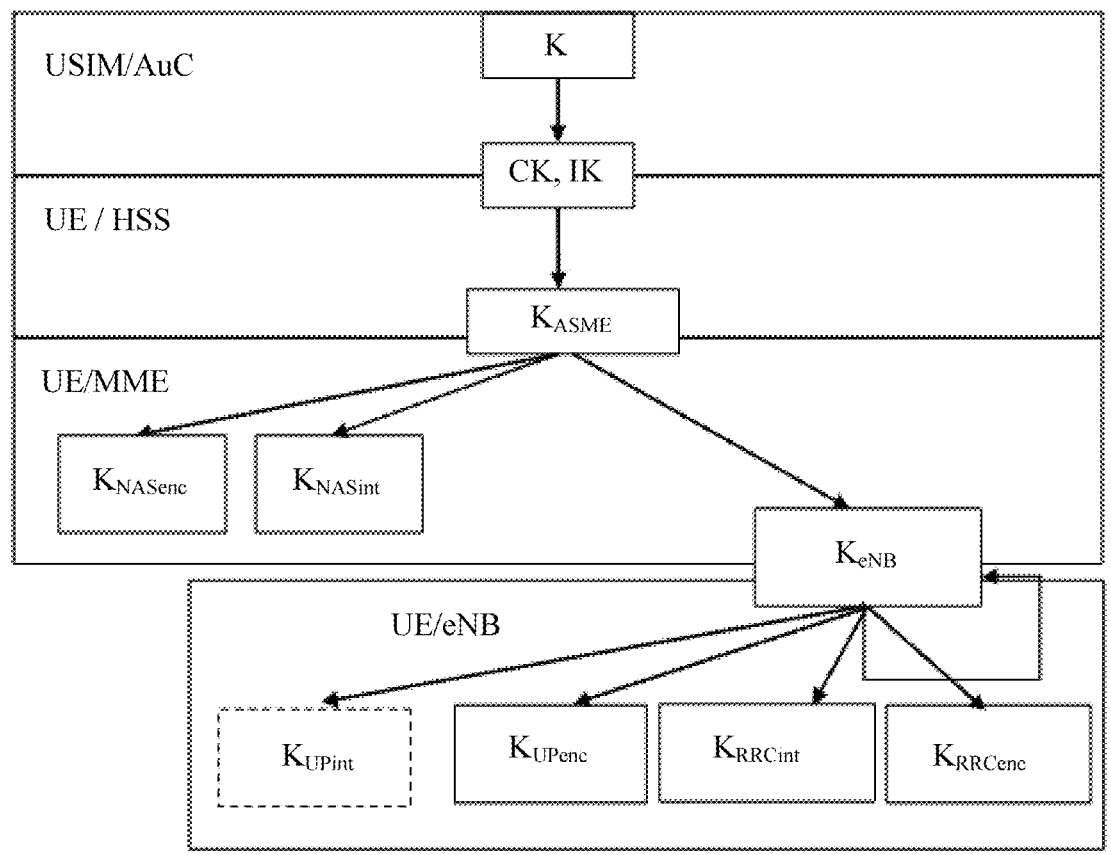
FIG. 2 is a key architectural diagram of the key negotiation process shown in FIG. 1.
Figure 3:
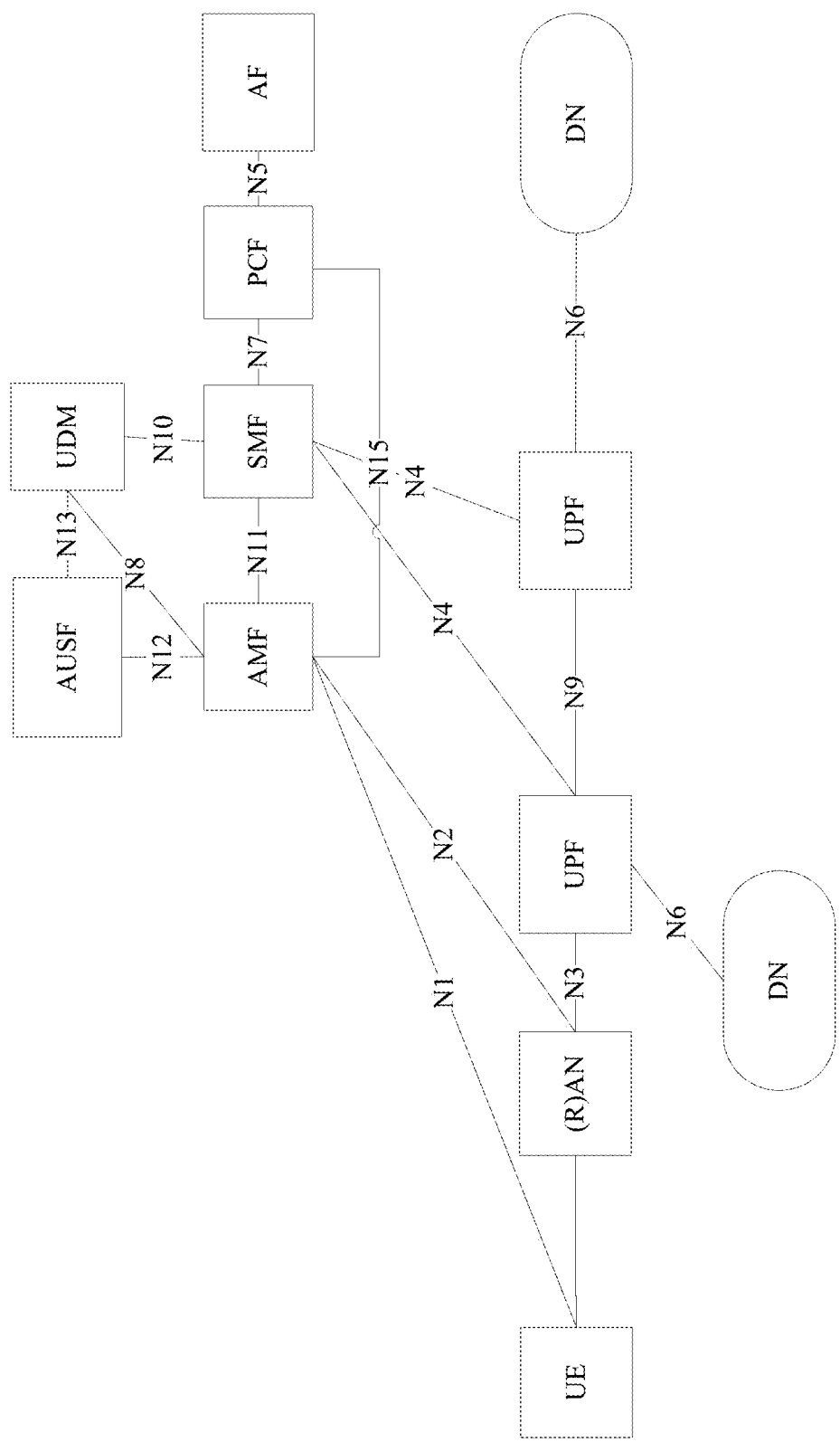
FIG. 3 is a network architectural diagram of accessing a 5G core network in a 3GPP access mode related to an embodiment of this application.
Figure 4:
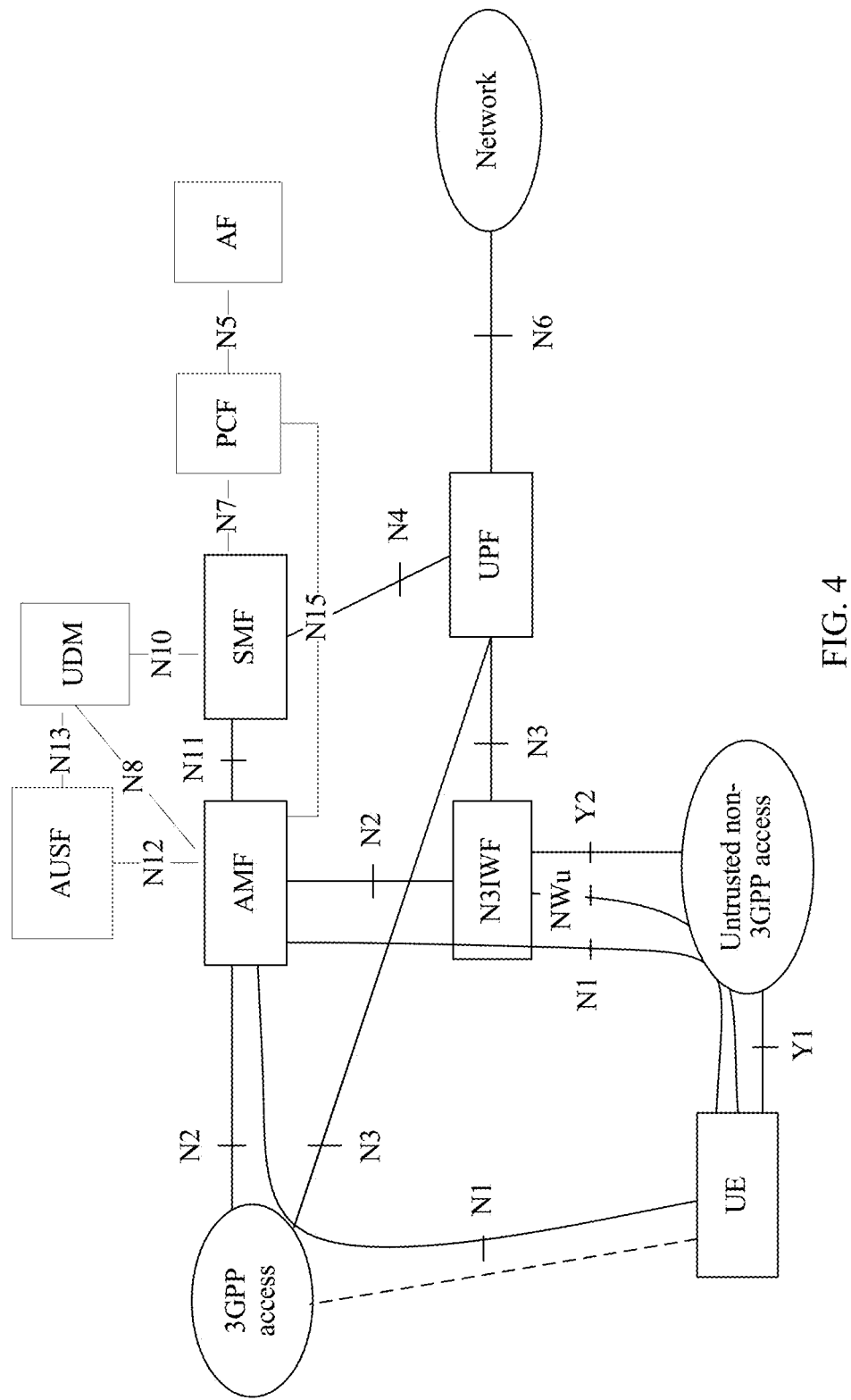
FIG. 4 is a network architectural diagram of accessing a 5G core network in a non-3GPP access mode related to an embodiment of this application.

FIG. 3 is a network architectural diagram related to an embodiment of this application. The network architecture is mainly applicable to a scenario in which a 5G core network is accessed in a 3GPP mode. FIG. 4 is another network architectural diagram related to an embodiment of this application. The network architecture is mainly applicable to a scenario in which a 5G core network is accessed in a non-3GPP mode. Both the network architectures shown in FIG. 3 and FIG. 4 include network elements related to key negotiation: a terminal, an access node (AN) (namely, N3IWF in FIG. 4), an access and mobility control function network element (AMF), a session management network element (SMF), an authentication server (AUSF), and a unified data management network element (UDM).

It should be noted that a security anchor such as a Security Anchor Function (SEAF) may be deployed in the AMF, and an authentication credential repository and processing function network element (ARPF) may be deployed in the UDM. Certainly, the SEAF may not be deployed in the AMF, but is deployed independently of the AMF. Similarly, the ARPF may not be deployed in the UDM, but is deployed independently of the UDM.

The following separately and briefly describes the network elements related to key negotiation (the terminal, the AN, the AMF, the SMF, the AUSF, and the UDM).

The terminal may be any one of a UE, a communications device, or an Internet of Things (IoT) device. The user equipment may be a smartphone, a smartwatch, a smart tablet, or the like. The communications device may be a server, a gateway (GW), a base station, a controller, or the like. The Internet of Things device may be a sensor, an electricity meter, a water meter, or the like.

The AN may be a wireless access point, for example, a base station, a Wi-Fi access point, or a Bluetooth access point. Alternatively, the AN may be a wired access point, for example, a gateway, a modem, fiber access, or IP access.

The AMF is responsible for access control and mobility management, and is a forwarding and processing node of non-access stratum (NAS) signaling.

The SMF is configured to execute establishment and management of a session, a slice, a flow, or a bearer. Subsequently, a physical entity that executes the function of the session management network element may be referred to as a session management (SM) device. The establishment and management of the slice, the flow, or the bearer are in the charge of the mobility management network element.

The AUSF is responsible for generating, managing, and negotiating a key. The AUSF may be separately deployed as an independent logical functional entity, or may be integrated into a Mobility Management network element, namely, a device such as the AMF or the session management network element (e.g., SMF). Additionally, the AUSF may be an authentication node of Evolved Packet System (EPS) Authentication and Key Agreement (EPS AKA) or Extensible Authentication Protocol (EAP) AKA (EAP AKA'), or a node of another authentication protocol.

The UDM means unified data management and mainly includes two parts. One part is a front end of a service or an application, and the other part is a user database. Further, the unified data management includes credential processing, location management, subscription data management, policy control, and the like, and also includes information storage of the related processing.

The SEAF, as a node that has a security authentication function, may be an authentication node of EAP AKA or EAP AKA' or a node of another authentication protocol. For example, when an authentication process is EPS AKA, the SEAF is to receive an intermediate key $K_{asme}$.

The ARPF stores a security credential and uses the security credential to perform a security-related operation, for example, generating a key and storing a security file. The ARPF should be deployed at a physically secure position, and can interact with the AUSF. In actual deployment, the ARPF may be a module of the UDM or is a separate network entity deployed with the UDM.

It should be noted that, FIG. 3 and FIG. 4 show a logical relationship between network elements. In practice, some network elements may be deployed separately, or two or more network elements may be integrated into one entity during deployment.

To generate a unified anchor key for different access modes, an embodiment of this application provides an anchor key generation method. In the method, not only the unified anchor key can be generated, but also the anchor key of different access modes can be separated from a lower-layer key generated based on the anchor key.

Figure 5:
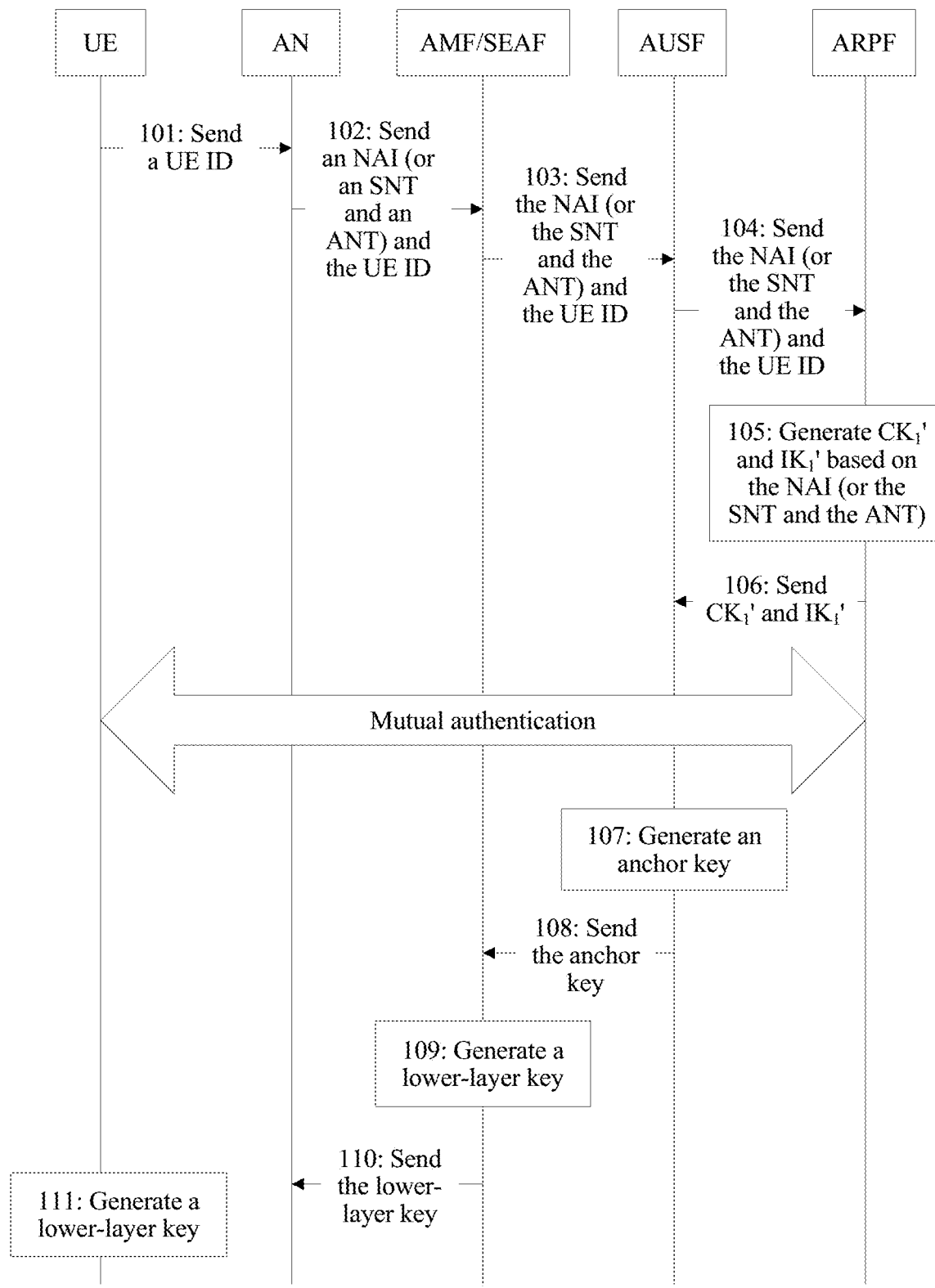
FIG. 5 is an interaction diagram of a first anchor key generation method according to an embodiment of this application.

As shown in FIG. 5, an embodiment of this application provides a first anchor key generation method. In this embodiment, an AUSF may be the first communications device in the claims, an AMF or an SEAF may be the second communications device in the claims, and an ARPF may be the third communications device in the claims. The method may be implemented based on the network architectures shown in FIG. 3 and FIG. 4, and the method includes but is not limited to the following steps below.

101. UE sends a terminal identifier to an AN. Correspondingly, the AN receives the terminal identifier sent by the UE.

In this embodiment of this application, the terminal identifier may be a fixed identifier, for example, a media access control (MAC) address, an Internet Protocol (IP) address, a mobile number, an International Mobile Equipment Identity (IMEI), an international mobile subscriber identity (IMSI), an IP multimedia private identity (IMPI), or an IP multimedia public identity (IMPU). Alternatively, the terminal identifier may be a temporarily allocated identifier, for example, a temporary mobile subscriber identity (TMSI) or a globally unique temporary UE identity (GUTI).

It may be understood that, in addition to the terminal identifier, the UE may send, to the AN, at least one of an access network parameter, a registration type, a security parameter, a 5G network capability of the UE, or a PDU session status. The access network parameter may be a parameter related to a service network, such as a frequency of an access network, a temporary user identity, or NSSAI. The registration type may indicate an initial registration of a user, registration caused by a movement, a periodic registration update, or the like, in order to distinguish between user registration behaviors. The security parameter is a parameter related to authentication and integrity protection. The NSSAI is short for network slice selection assistance information. The 5G network capability of the UE may include a configuration capability that supports access to the network. The PDU session is a service connection of a PDU between the UE and a data network, and a type of the service connection may be an IP or Ethernet service connection.

102. The AN sends the terminal identifier and an indication identifier to the AMF (or the SEAF). Correspondingly, the AMF (or the SEAF) receives the terminal identifier and the indication identifier sent by the AN.

In this embodiment of this application, the indication identifier is used to indicate an access mode of the terminal. In a 5G standard, the access mode of the terminal may be classified based on different classification bases. For example, the classification bases of the access mode may include an access type and an operator type. The access type may be classified into a 3GPP access type, a trusted non-3GPP access type, and an untrusted non-3GPP access type.

The operator type may be classified into an operator type A or an operator type B. It may be understood that there may be more operator types. The operator types are merely examples herein, and are not specifically limited.

For example, the classification bases include the access type and the operator type. Classification of the access mode may be as shown in Table 1.

TABLE 1

Access mode table

| | Access type | | |
|---|---|---|---|
| Operator type | 3GPP access type | Trusted non-3GPP access type | Untrusted non-3GPP access type |
| Operator type A | Access mode 1 | Access mode 2 | Access mode 3 |
| Operator type B | Access mode 4 | Access mode 5 | Access mode 6 |

It should be noted that the classification bases are not limited to the foregoing two types of classification bases. The classification basis of the access mode may be another type of classification basis, for example, a medium type (wired access or wireless access). This is not specifically limited herein. In addition, the classification bases are not limited to the two classification bases: the access type and the operator type. There may be one, three, four, or more classification bases of the access mode, that is, the access mode may be classified by more dimensions or fewer dimensions. For example, the access mode may be distinguished only by a dimension including the 3GPP access type and the non-3GPP access type.

The indication identifier may be carried in the access network parameter. The indication identifier may be any one of the following manners. The indication identifier may be a Network Access Identifier (NAI) used to indicate both the access type and the operator type. Alternatively, the indication identifier may include an access type identifier and an operator type identifier, where the access type identifier is used to indicate the access type, and the operator type identifier is used to indicate the operator type. It may be understood that the foregoing example is merely used as an example, and does not constitute a specific limitation.

In some possible implementations, the network access identifier may be an SN identity | an access network identity, that is, may particularly indicate a type of access of an operator, for example, wireless local area network (WLAN) access of China Unicom. The SN identity herein is defined in a 4G network, and the access network identity is defined in a non-3GPP network in 4G. It is also possible to upgrade the SN identity or access network identity mode, such that it can represent a particular access type of a particular operator.

In some possible implementations, the access type identifier indicates that the access type is a 3GPP access type, a trusted non-3GPP access type, and an untrusted non-3GPP access type. For example, the access type identifier access network type (ANT) may be directly character strings such as "3GPP network", "Trusted Non-3GPP network", and "Untrusted Non-3GPP network", or may be only character strings such as "3GPP network" and "Non-3GPP network".

In some possible implementations, the operator type identifier may include two parts: One part is used to indicate an operator, and the other part is used to indicate a specific access type. For example, the operator type identifier may indicate Long-Term Evolution (LTE) access of China Mobile or WLAN access of China Unicom. In application, a combination of the SN Identity and the Access Network Identity may be used as an operator type identifier. Alternatively, the operator type identifier may only indicate an operator, such as China Mobile, China Unicom, and China Telecom.

In some possible implementations, it may be possible that the indication identifier is only an operator type identifier.

In some possible implementations, it may be possible that the indication identifier is only an access type identifier.

103. The AMF (or the SEAF) sends the terminal identifier and the indication identifier to the AUSF. Correspondingly, the AUSF receives the terminal identifier and the indication identifier sent by the AMF (or the SEAF).

104. The AUSF sends the terminal identifier and the indication identifier to the ARPF. Correspondingly, the ARPF receives the terminal identifier and the indication identifier sent by the AUSF.

105. The ARPF generates an intermediate key based on a cipher key CK, an integrity key (IK), and the indication identifier.

In this embodiment of this application, the ARPF may generate the intermediate key based on a key generation algorithm in the following several manners.

In a first manner, when the indication identifier is an NAI, the ARPF generates the intermediate key based on the following key generation algorithm: $(CK_1', IK_1')=KDF(SQN \oplus AK, NAI, CK\|IK)$, where $(CK_1', IK_1')$ is the intermediate key, $CK_1'$ is the intermediate cipher key, $IK_1'$ is the intermediate integrity key, KDF is the key generation algorithm, SQN is a latest sequence number, NAI is the indication identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

In a second manner, when the indication identifier includes an access type identifier and an operator type identifier, the ARPF generates the intermediate key based on the following key generation algorithm: $(CK_1', IK_1')=KDF(SQN \oplus AK, ANT, SNT, CK\|IK)$, where $(CK_1', IK_1')$ is the intermediate key, $CK_1'$ is the intermediate cipher key, $IK_1'$ is the intermediate integrity key, KDF is the key generation algorithm, SQN is a latest sequence number, ANT is the access type identifier, SNT is the operator type identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

In some possible implementations, SQN may be a latest sequence number generated by an AuC, and after generating SQN, the AuC sends SQN to the ARPF. Similarly, RAND may be a random number generated by the AuC, and after generating RAND, the AuC sends RAND to the ARPF. In addition to the foregoing manner, SQN and RAND may be generated by another communications device in the network architecture and sent to the ARPF. SQN and RAND may be even generated by the ARPF itself. This is not specifically limited herein.

In some possible implementations, CK may be generated by the AuC based on a formula $CK=f3(RAND)$, IK may be generated by the AuC based on a formula $IK=f4(RAND)$, and AK may be generated by the AuC based on a formula $AK=f5(RAND)$. In addition to the foregoing manner, CK, IK, and AK may be generated by another communications device in the network architecture and sent to the ARPF. CK, IK, and AK may be even generated by the ARPF itself. This is not specifically limited herein.

106. The ARPF sends the intermediate key to the AUSF. Correspondingly, the AUSF receives the intermediate key sent by the ARPF.

107. The AUSF generates an anchor key based on the intermediate key.

In this embodiment of this application, the AUSF generates the anchor key based on the following formula: anchor key=KDF($IK_1'\|CK_1'$), where anchor key is the anchor key, ($IK_1'$, $CK_1'$) is the intermediate key, $IK_1'$ is the intermediate integrity key, $CK_1'$ is the intermediate cipher key, and $\|$ means concatenation, indicating that characters on both sides of the symbol are connected in series. The AUSF may also generate the anchor key based on the following formula: anchor key=KDF($IK_1'$, $CK_1'$).

108. The AUSF sends the anchor key to the AMF (or SEAF). Correspondingly, the AMF (or the SEAF) receives the anchor key sent by the AUSF.

109. The AMF (or the SEAF) generates a lower-layer key based on the anchor key. The lower-layer key is a key obtained by performing one or more times of derivation based on the anchor key.

In this embodiment of this application, the anchor key is generated based on the intermediate key, and the intermediate key is generated based on the indication identifier. Therefore, a relationship between the anchor key and the indication identifier may be represented as anchor key=f (ANT, SNT) or anchor key=f(NAI), where f indicates a mapping function between the indication identifier and the anchor key, NAI is the network access identifier, ANT is the access type identifier, and SNT is the operator type identifier. According to the mapping relationship between the anchor key and the indication identifier, it can be learned that, when the indication identifier is different, a value of the anchor key is also different. That is, when the access mode is different, the value of the anchor key is different, in other words, anchor keys of different access modes are separated. In addition, the AMF (or the SEAF) separately derives lower-layer keys of different access modes based on anchor keys of the different access modes, in order to implement separation between the lower-layer keys. To be more specific, it is assumed that when the access mode is an access mode A, an anchor key obtained through calculation is an anchor key a; and when the access mode is an access mode B, an anchor key obtained through calculation is an anchor key b. Then, a lower-layer key of the access mode A may be derived based on the anchor key a, and a lower-layer key of the access mode B may be derived based on the anchor key b.

110. The AMF (or the SEAF) sends the lower-layer key to the AN.

111. The UE generates an anchor key based on a root key, and then derives a lower-layer key based on the anchor key. It may be understood that a process of deriving, by the UE, the lower-layer key is substantially similar to the foregoing process, and details are not described herein again.

It may be understood that, in step 108, the AUSF may further generate a key $K_{AMF}$ or a key $K_{SEAF}$ based on the anchor key, and then send the key $K_{AMF}$ or the key $K_{SEAF}$ to the AMF or the SEAF, instead of sending the anchor key to the AMF or the SEAF. Therefore, in step 109, the AMF or the SEAF generates the lower-layer key based on the key $K_{AMF}$ or the key $K_{SEAF}$.

It should be noted that, when access modes are different, step 109 to step 111 are different. The following provides detailed description by separately using an example that the access mode is a 3GPP access mode and an example that the access mode is a non-3GPP access mode.

Figure 6A:
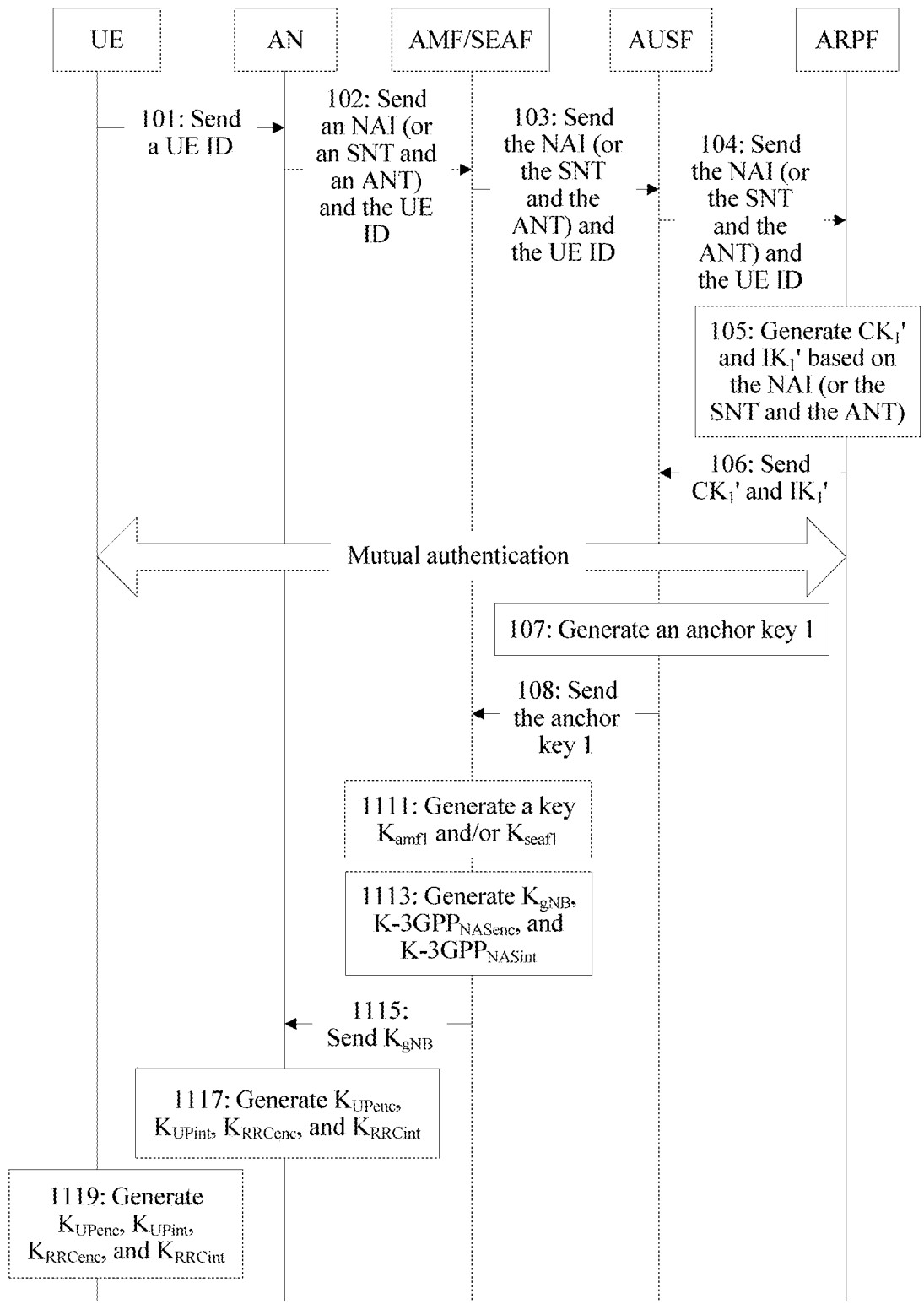
FIG. 6A and FIG. 6B are interaction diagrams of the anchor key generation method shown in FIG. 5 in a 3GPP mode and in a non-3GPP mode, respectively.

As shown in FIG. 6A, it is assumed that the access mode is the 3GPP access mode, and the anchor key is an anchor key 1. Then, step 109 to step 111 may be replaced with the following steps 1111 to 1117.

1111. The AMF (or the SEAF) generates a lower-layer key $K_{amf1}$ key and/or $K_{seaf1}$ key based on the following formulas:

$$K_{amf1}=KDF(\text{anchor key1}, AMF\ \text{ID});$$

$$K_{seaf1}=KDF(\text{anchor key1}, SEAF\ \text{ID}),$$

where anchor key1 is an anchor key in the 3GPP access mode, KDF is a key generation algorithm, AMF ID is an identifier of the AMF, and SEAF ID is an identifier of the SEAF.

The identifier of the AMF may be a MAC address, an IP address, or the like of the AMF, and the identifier of the SEAF may be a MAC address, an IP address, or the like of the SEAF.

1113. The AMF (or the SEAF) then generates a base station key $K_{gNB}$, a 3GPP-NAS cipher key $K\text{-}3GPP_{NASenc}$, and a 3GPP-NAS integrity protection key $K\text{-}3GPP_{NASint}$ in the 3GPP access mode based on the following formulas:

$$K_{gNB}=KDF(K_{amf1}\ \text{and/or}\ Kseaf1, \text{NAS Count1});$$

$$K\text{-}3GPP_{NASint}=KDF(K_{amf1}\ \text{and/or}\ Kseaf1, \text{NAS-int-alg,alg-ID});$$

$$K\text{-}3GPP_{NASenc}=KDF(K_{amf1}\ \text{and/or}\ Kseaf1, \text{NAS-enc-alg,alg-ID}),$$

where NAS Count1 is a count value of a NAS message passing a 3GPP access point gNB, and may be an uplink count value or may be a downlink count value, NAS-int-alg is an integrity algorithm corresponding to the NAS message, such as 'AES', 'SNOW 3G', or 'ZUC', alg-ID is an algorithm distinguisher, and NAS-enc-alg is an encryption algorithm corresponding to the NAS message, such as 'AES', 'SNOW 3G', or 'ZUC'.

1115. The AMF (or the SEAF) sends the base station key $K_{gNB}$ to the AN. In this case, the AN correspondingly receives the base station key $K_{gNB}$ sent by the AMF (or the SEAF).

1117. The AN generates a user plane cipher key $K_{UPenc}$, a user plane integrity key $K_{UPint}$, a control plane cipher key $K_{RRCenc}$, and a control plane integrity key $K_{RRCint}$ based on the base station key $K_{gNB}$.

In this embodiment of this application, the AN separately generates the user plane cipher key $K_{UPenc}$, the user plane integrity key $K_{UPint}$, the control plane cipher key $K_{RRCenc}$, and the control plane integrity key $K_{RRCint}$ based on the following formulas:

$$K_{UPenc}=KDF(K_{gNB},\text{UP-enc-alg,alg-ID});$$

$$K_{UPint}=KDF(K_{gNB},\text{UP-int-alg,alg-ID});$$

$$K_{RRCenc}=KDF(K_{gNB},\text{RRC-enc-alg,alg-ID});$$

$$K_{RRCint}=KDF(K_{gNB},\text{RRC-int-alg,alg-ID}),$$

where KDF is a key generation algorithm, $K_{gNB}$ is the base station key, alg-ID is an algorithm distinguisher. For definitions of NAS-int-alg, NAS-enc-alg, UP-enc-alg, UP-int-alg, RRC-enc-alg, and RRC-int-alg, refer to the algorithm distinguisher definition table in 4G shown in Table 2, which is as follows below.

TABLE 2

Algorithm distinguisher definition

| Algorithm distinguisher (Algorithm distinguisher) | Value (Value) |
|---|---|
| NAS-enc-alg | 0x01 |
| NAS-int-alg | 0x02 |
| RRC-enc-alg | 0x03 |
| RRC-int-alg | 0x04 |
| UP-enc-alg | 0x05 |
| UP-int-alg | 0x06 |

1119. The UE generates an anchor key based on a root key, and then derives a user plane cipher key ($K_{UPenc}$), a user plane integrity key ($K_{UPint}$), a control plane cipher key ($K_{RRCenc}$), and a control plane integrity key ($K_{RRCint}$) based on the anchor key.

It may be understood that after receiving the anchor key, the AMF (or the SEAF) may not derive the $K_{amf1}$ key and/or the $K_{seaf1}$ key based on the anchor key, or then derive the base station key $K_{gNB}$, the 3GPP-NAS cipher key K-3GPP-$NAS_{enc}$, and the 3GPP-NAS integrity protection key K-3GPPNAS$_{int}$ based on the $K_{amf1}$ key and/or the $K_{seaf1}$ key. Instead, the AMF (or the SEAF) may directly derive the base station key $K_{gNB}$, the 3GPP-NAS cipher key K-3GPPNA-$S_{enc}$, and the 3GPP-NAS integrity protection key K-3GPP-NAS$_{int}$ based on the anchor key.

Figure 6B:
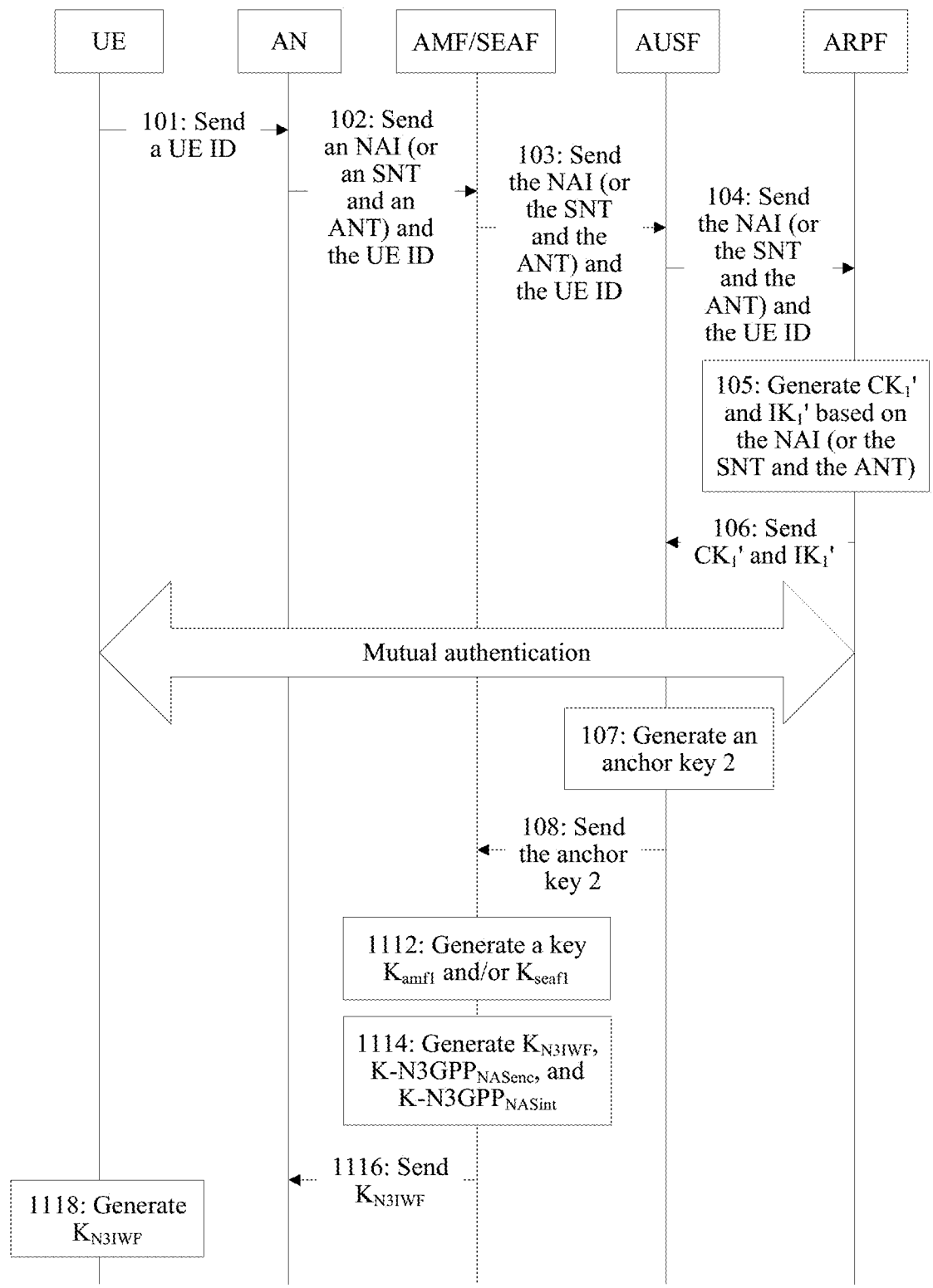

As shown in FIG. 6B, it is assumed that the access mode is the non-3GPP access mode, and the anchor key is an anchor key 2. Then, step 109 to step 111 may be replaced with the following steps 1112 to 1116.

1112. The AMF (or the SEAF) generates a key $K_{amf2}$ and/or a key $K_{seaf2}$ based on the following formulas:

$$K_{amf2}=KDF(\text{anchor key2}, AMF\ ID);$$

$$K_{seaf2}=KDF(\text{anchor key2}, SEAF\ ID),$$

where anchor key2 is an anchor key in the non-3GPP access mode, KDF is a key generation algorithm, AMF ID is an identifier of the AMF, and SEAF ID is an identifier of the SEAF.

1114. The AMF (or the SEAF) then generates an access point key $K_{N3IWF}$, a non-3GPP-NAS cipher key K-N3GPP$_{NASenc}$, and a non-3GPP-NAS integrity protection key K-N3GPP$_{NASint}$ in the non-3GPP access mode based on the following formulas:

$$K_{N3IWF}=KDF(K_{amf2}\ \text{and/or}\ K_{seaf2},\text{NAS Count2});$$

$$K\text{-}N3GPP_{NASint}=KDF(K_{amf2}\ \text{and/or}\ K_{seaf2},\text{NAS-int-alg,alg-ID});$$

$$K\text{-}N3GPP_{NASenc}=KDF(K_{amf2}\ \text{and/or}\ K_{seaf2},\text{NAS-enc-alg,alg-ID}),$$

where NAS Count2 is a count value of a NAS message passing a non-3GPP access point N3IWF, and may be an uplink count value or may be a downlink count value, NAS-int-alg is an integrity algorithm corresponding to the NAS message, such as 'AES', 'SNOW 3G', or 'ZUC', alg-ID is an algorithm distinguisher, and NAS-enc-alg is an encryption algorithm corresponding to the NAS message, such as 'AES', 'SNOW 3G', or 'ZUC'.

1116. The AMF (or the SEAF) sends the access point key $K_{N3IWF}$ to the AN. In this case, the AN correspondingly receives the access point key $K_{N3IWF}$ sent by the AMF (or the SEAF).

1118. The UE generates an anchor key based on a root key, and then derives an access point key $K_{N3IWF}$ based on the anchor key.

Similarly, it may be understood that, in step 1114, the AMF (or the SEAF) does not receive the anchor key sent by the AUSF, but the $K_{AMF}$ key or the $K_{SEM}$ key generated by the AUSF based on the anchor key.

It may be understood that, the key generation algorithm in the embodiment shown in FIG. 5 is not limited to the KDF algorithm. In application, the key generation algorithm may be another algorithm, such as a Trunc algorithm: a Trunc algorithm for truncating least significant bits, or another HASH algorithm. This is not specifically limited in this application. In addition, an independent variable of the key generation algorithm may also include another parameter, such as NSSAI, a random number, a Number used once (Nonce), a sequence number, a registration type, an non-access stratum message count (NAS Count), a security algorithm distinguisher, a security identifier, a length of SQN $\oplus$ AK, or a length corresponding to a parameter used for generating a key. In application, one or more parameters may be selected therefrom based on requirements as independent variables of the key generation algorithm.

It may be understood that after receiving the anchor key, the AMF (or the SEAF) may not derive the $K_{amf1}$ key and/or the $K_{seaf1}$ key based on the anchor key, or then derive the access point key $K_{N3IWF}$, the non-3GPP-NAS cipher key K-N3GPP$_{NASenc}$, and the non-3GPP-NAS integrity protection key K-N3GPP$_{NASint}$ based on the $K_{amf1}$ key and/or the $K_{seaf1}$ key; but directly derives the access point key $K_{N3IWF}$, the non-3GPP-NAS cipher key K-N3GPP$_{NASenc}$, and the non-3GPP-NAS integrity protection key K-N3GPP$_{NASint}$ based on the anchor key.

Figure 7:
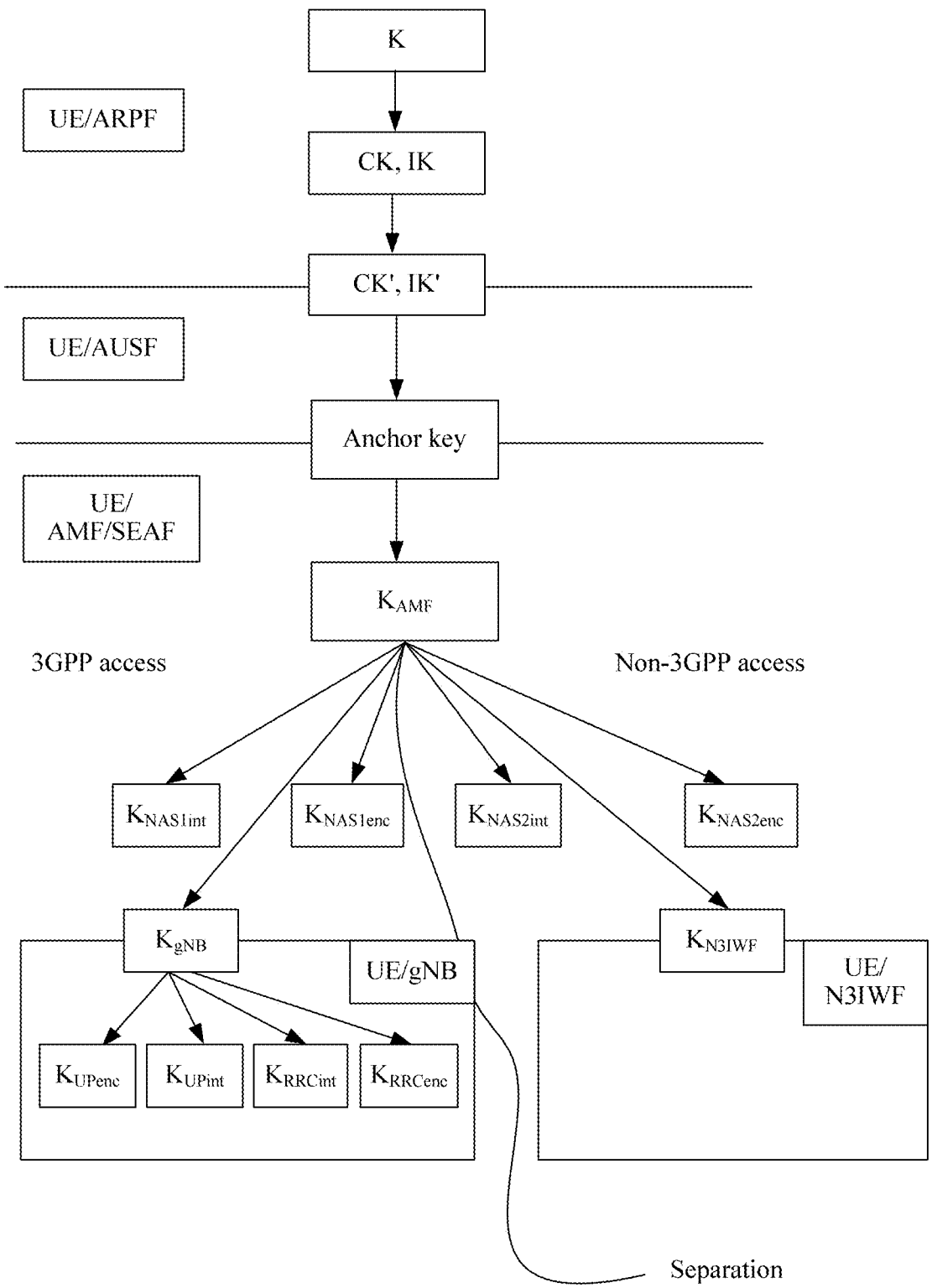
FIG. 7 is a key architectural diagram obtained by using the anchor key generation method shown in FIG. 5.

After the anchor key generation method shown in FIG. 5 is executed, a key architecture shown in FIG. 7 is to be generated. On the left of a separation line in FIG. 7, there is a key architecture generated by performing the process shown in FIG. 6A. On the right of the separation line in FIG. 7, there is a key architecture generated by performing the process shown in FIG. 6B. The two key architectures can be well separated.

Figure 8:
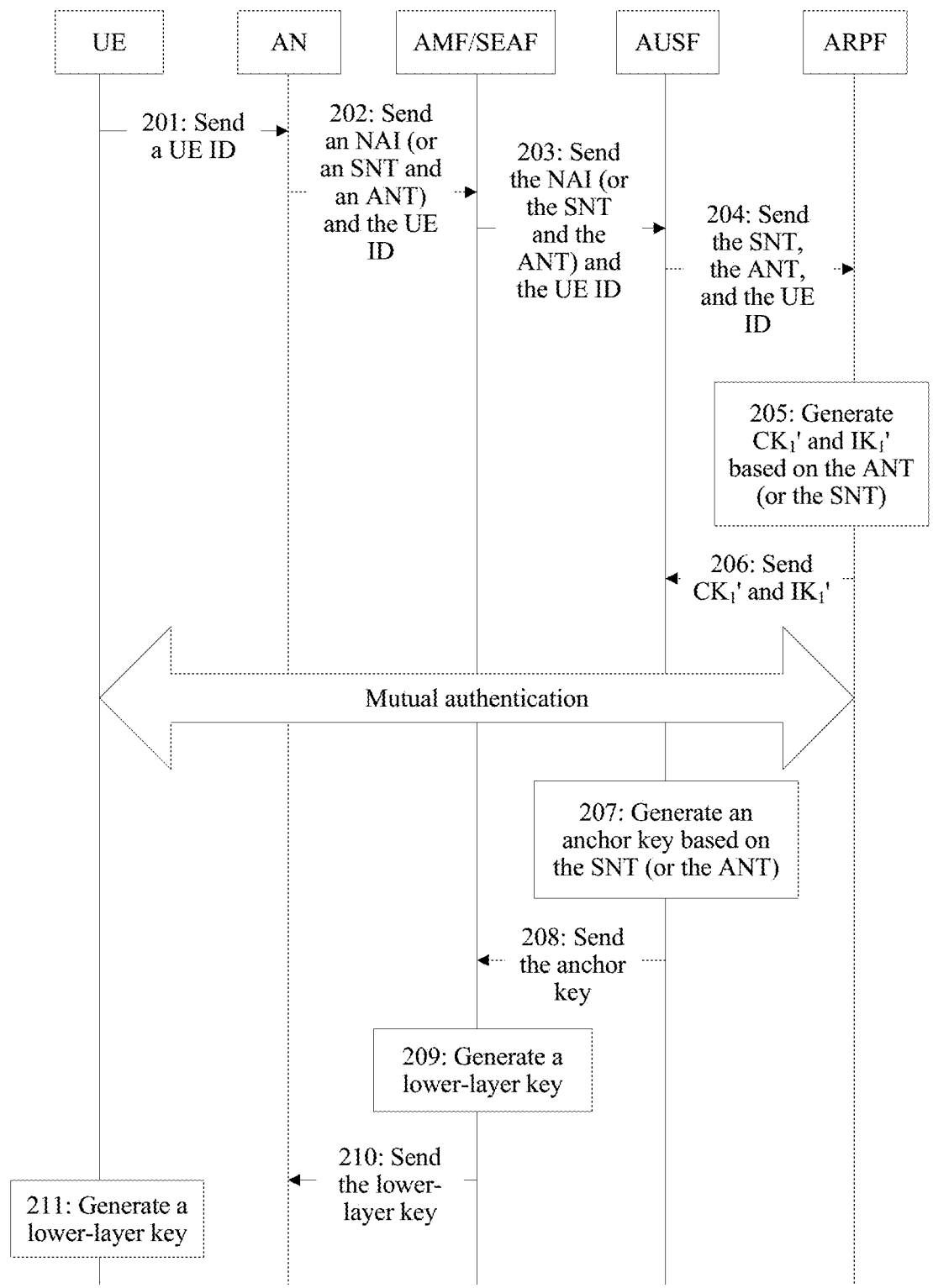
FIG. 8 is an interaction diagram of a second anchor key generation method according to an embodiment of this application.

As shown in FIG. 8, an embodiment of this application provides a second anchor key generation method. In this embodiment, an AUSF may be the first communications device in the claims, an AMF or an SEAF may be the second communications device in the claims, and an ARPF may be the third communications device in the claims. The method may be implemented based on the network architectures shown in FIG. 3 and FIG. 4, and the method includes but is not limited to the following steps.

201. UE sends a terminal identifier to an AN. Correspondingly, the AN receives the terminal identifier sent by the UE.

202. The AN sends the terminal identifier and an indication identifier to the AMF (or the SEAF). Correspondingly, the AMF (or the SEAF) receives the terminal identifier and the indication identifier sent by the AN. The indication identifier includes an ANT and an SNT.

203. The AMF (or the SEAF) sends the terminal identifier and the indication identifier to the AUSF. Correspondingly, the AUSF receives the terminal identifier and the indication identifier sent by the AMF (or the SEAF).

204. The AUSF sends the terminal identifier and the indication identifier to the ARPF. Correspondingly, the ARPF receives the terminal identifier and the indication identifier sent by the AUSF.

205. The ARPF generates an intermediate key based on a cipher key CK, an integrity key IK, and the ANT.

In this embodiment of this application, the ARPF may generate the intermediate key based on a key generation algorithm in the following several manners.

In a first manner, the ARPF generates the intermediate key based on the following key generation algorithm: $(CK_1', IK_1')=KDF(SQN \oplus AK, ANT, CK \| IK)$, where $(CK_1', IK_1')$ is the intermediate key, $CK_1'$ is the intermediate cipher key, $IK_1'$ is the intermediate integrity key, KDF is the key generation algorithm, SQN is a latest sequence number, ANT is the access type identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

In a second manner, the ARPF generates the intermediate key based on the following key generation algorithm: $(CK_1', IK_1')=KDF(SQN \oplus AK, SNT, CK \| IK)$, where $(CK_1', IK_1')$ is the intermediate key, $CK_1'$ is the intermediate cipher key, $IK_1'$ is the intermediate integrity key, KDF is the key generation algorithm, SQN is a latest sequence number, SNT is the operator type identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

206. The ARPF sends the intermediate key to the AUSF. Correspondingly, the AUSF receives the intermediate key sent by the ARPF.

207. The AUSF generates an anchor key based on the intermediate key.

For the first manner of generating the intermediate key in step 205, the AUSF generates the anchor key based on the intermediate key in the following manner.

First, the AUSF generates an EMSK' based on the intermediate key: $EMSK'=PRF'(IK_2' \| CK_2')$, where EMSK' is an extended master session key, $(IK_2', CK_2')$ is the intermediate key, $IK_2'$ is the intermediate integrity key, $CK_2'$ is the intermediate cipher key, and $\|$ means concatenation, indicating that characters on both sides of the symbol are connected in series.

Then, the AUSF generates the anchor key based on the following formula: anchor key=KDF(EMSK', SNT), where anchor key is the anchor key, and SNT is the operator type identifier.

For the second manner of generating the intermediate key in step 205, the AUSF generates the anchor key based on the intermediate key in the following manner.

First, the AUSF generates an EMSK' based on the intermediate key: $EMSK'=PRF'(IK_2' \| CK_2')$, where EMSK' is an extended master session key, $(IK_2', CK_2')$ is the intermediate key, $IK_2'$ is the intermediate integrity key, $CK_2'$ is the intermediate cipher key, and $\|$ means concatenation, indicating that characters on both sides of the symbol are connected in series.

Then, the AUSF generates the anchor key based on the following formula: anchor key=KDF(EMSK', ANT), where anchor key is the anchor key, and ANT is the access type identifier.

Alternatively, the anchor key may be generated based on the EMS K' and another parameter, which is not limited to the indication identifier.

It may be understood that the anchor key may also be generated based on an MSK', and using the EMSK' to generate the anchor key herein is only used as an example.

208. The AUSF sends the anchor key to the AMF (or the SEAF). Correspondingly, the AMF (or the SEAF) receives the anchor key sent by the AUSF.

209. The AMF (or the SEAF) generates a lower-layer key based on the anchor key. The lower-layer key is a key obtained by performing one or more times of derivation based on the anchor key.

210. The AMF (or the SEAF) sends the lower-layer key to the AN.

211. The UE generates an anchor key based on a root key, and then derives a lower-layer key based on the anchor key.

Figure 9:
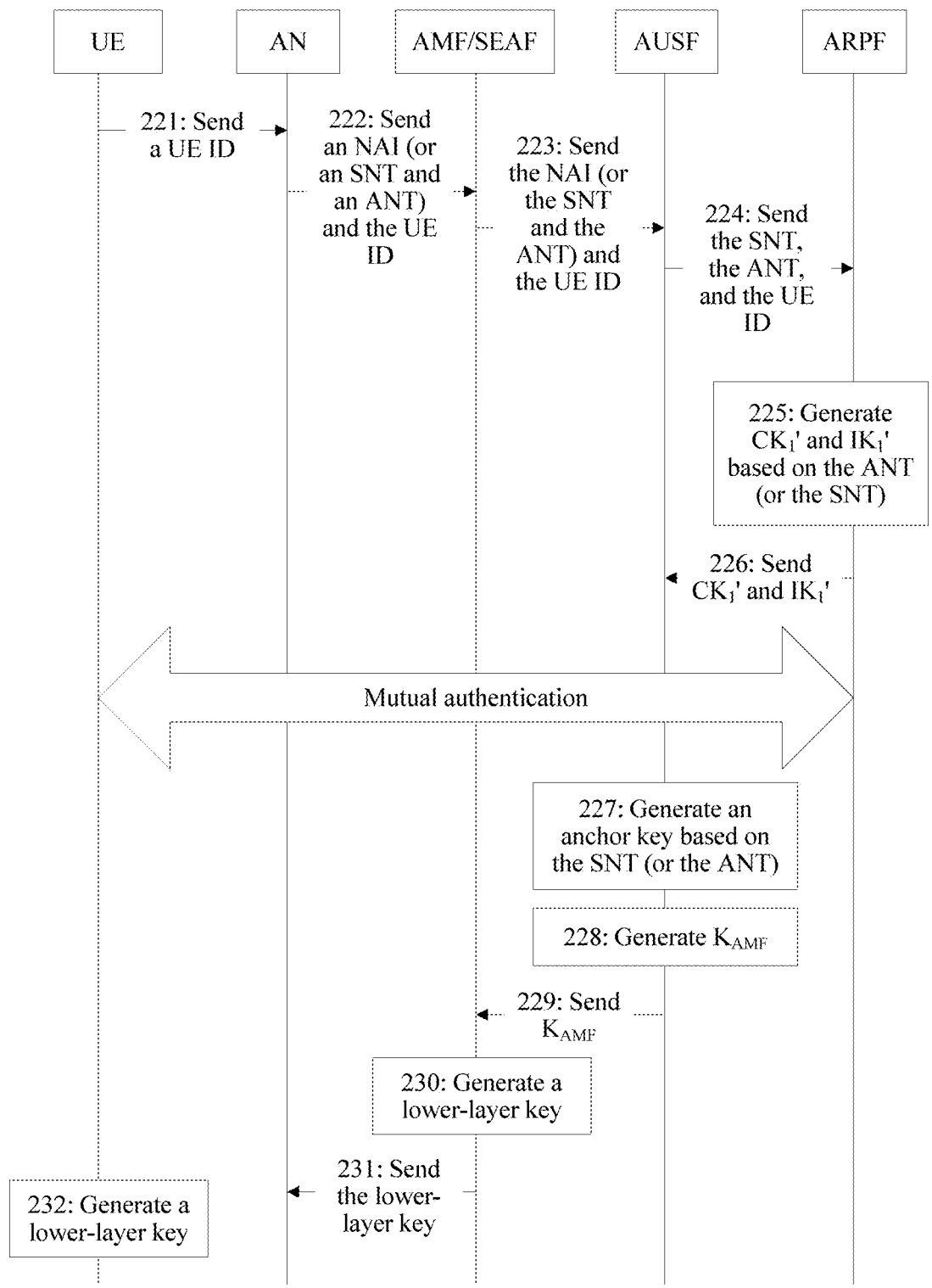
FIG. 9 is an interaction diagram of a third anchor key generation method according to an embodiment of this application.

As shown in FIG. 9, an embodiment of this application provides a third anchor key generation method. In this embodiment, an AUSF may be the first communications device in the claims, an AMF or an SEAF may be the second communications device in the claims, and an ARPF may be the third communications device in the claims. The method may be implemented based on the network architectures shown in FIG. 3 and FIG. 4, and the method includes but is not limited to the following steps.

221. UE sends a terminal identifier to an AN. Correspondingly, the AN receives the terminal identifier sent by the UE.

222. The AN sends the terminal identifier and an indication identifier to the AMF (or the SEAF). Correspondingly, the AMF (or the SEAF) receives the terminal identifier and the indication identifier sent by the AN. The indication identifier includes an ANT and an SNT.

223. The AMF (or the SEAF) sends the terminal identifier and the indication identifier to the AUSF. Correspondingly, the AUSF receives the terminal identifier and the indication identifier sent by the AMF (or the SEAF).

224. The AUSF sends the terminal identifier and the indication identifier to the ARPF. Correspondingly, the ARPF receives the terminal identifier and the indication identifier sent by the AUSF.

225. The ARPF generates an intermediate key based on a cipher key CK, an integrity key IK, and the ANT.

In this embodiment of this application, the ARPF may generate the intermediate key based on a key generation algorithm in the following several manners.

In a first manner, the ARPF generates the intermediate key based on the following key generation algorithm: $(CK_1', IK_1')=KDF(SQN \oplus AK, ANT, CK \| IK)$, where $(CK_1', IK_1')$ is the intermediate key, $CK_1'$ is the intermediate cipher key, $IK_1'$ is the intermediate integrity key, KDF is the key generation algorithm, SQN is a latest sequence number, ANT is the access type identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

In a second manner, the ARPF generates the intermediate key based on the following key generation algorithm: $(CK_1', IK_1')=KDF(SQN \oplus AK, SNT, CK \| IK)$, where $(CK_1', IK_1')$ is the intermediate key, $CK_1'$ is the intermediate cipher key, $IK_1'$ is the intermediate integrity key, KDF is the key generation algorithm, SQN is a latest sequence number, SNT is the operator type identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

226. The ARPF sends the intermediate key to the AUSF. Correspondingly, the AUSF receives the intermediate key sent by the ARPF.

227. The AUSF generates an anchor key based on the intermediate key.

For the first manner of generating the intermediate key in step 225, the AUSF generates the anchor key based on the intermediate key in the following manner.

First, the AUSF generates an EMSK' based on the intermediate key: EMSK'=PRF'(IK$_2$'||CK$_2$'), where EMSK' is an extended master session key, (IK$_2$', CK$_2$') is the intermediate key, IK$_2$' is the intermediate integrity key, CK$_2$' is the intermediate cipher key, and || means concatenation, indicating that characters on both sides of the symbol are connected in series.

Then, the AUSF generates the anchor key based on the following formula: anchor key=KDF(EMSK', SNT), where anchor key is the anchor key, and SNT is the operator type identifier.

For the second manner of generating the intermediate key in step 225, the AUSF generates the anchor key based on the intermediate key in the following manner.

First, the AUSF generates an EMSK' based on the intermediate key: EMSK'=PRF'(IK$_2$'||CK$_2$'), where EMSK' is an extended master session key, (IK$_2$', CK$_2$') is the intermediate key, IK$_2$' is the intermediate integrity key, CK$_2$' is the intermediate cipher key, and || means concatenation, indicating that characters on both sides of the symbol are connected in series.

Then, the AUSF generates the anchor key based on the following formula: anchor key=KDF(EMSK', ANT), where anchor key is the anchor key, and ANT is the access type identifier.

It may be understood that, the anchor key may be generated based on the EMSK' and another parameter, which is not limited to the indication identifier.

It may be understood that the anchor key may also be generated based on an MSK', and using the EMSK' to generate the anchor key herein is only used as an example.

228. The AUSF generates a key K$_{AMF}$ and/or a key K$_{SEAF}$ based on the anchor key.

In this embodiment of this application, the AUSF generates the key K$_{AMF}$ or the key K$_{SEAF}$ based on the following key generation algorithms:

$$K_{AMF}=KDF(\text{anchor key}, AMF\ ID);$$

$$K_{SEAF}=KDF(\text{anchor key}, SEAF\ ID),$$

where anchor key is the anchor key, KDF is the key generation algorithm, AMF ID is an identifier of the AMF, and SEAF ID is an identifier of the SEAF.

229. The AUSF sends the key K$_{AMF}$ and/or the key K$_{SEAF}$ to the AMF (or the SEAF). Correspondingly, the AMF (or the SEAF) receives the key K$_{AMF}$ and/or the key K$_{SEAF}$ sent by the AUSF.

230. The AMF (or the SEAF) generates a lower-layer key based on the key K$_{AMF}$ and/or the key K$_{SEAF}$. The lower-layer key is a key obtained by performing one or more times of derivation based on the key K$_{AMF}$ and/or the key K$_{SEAF}$.

231. The AMF (or the SEAF) sends the lower-layer key to the AN.

232. The UE generates an anchor key based on a root key, and then derives a lower-layer key based on the anchor key.

It may be understood that after generating the anchor key, the AUSF may also directly send the anchor key to the AMF, and then the AMF generates the lower-layer key based on the anchor key and sends the lower-layer key to the AN.

Figure 10:
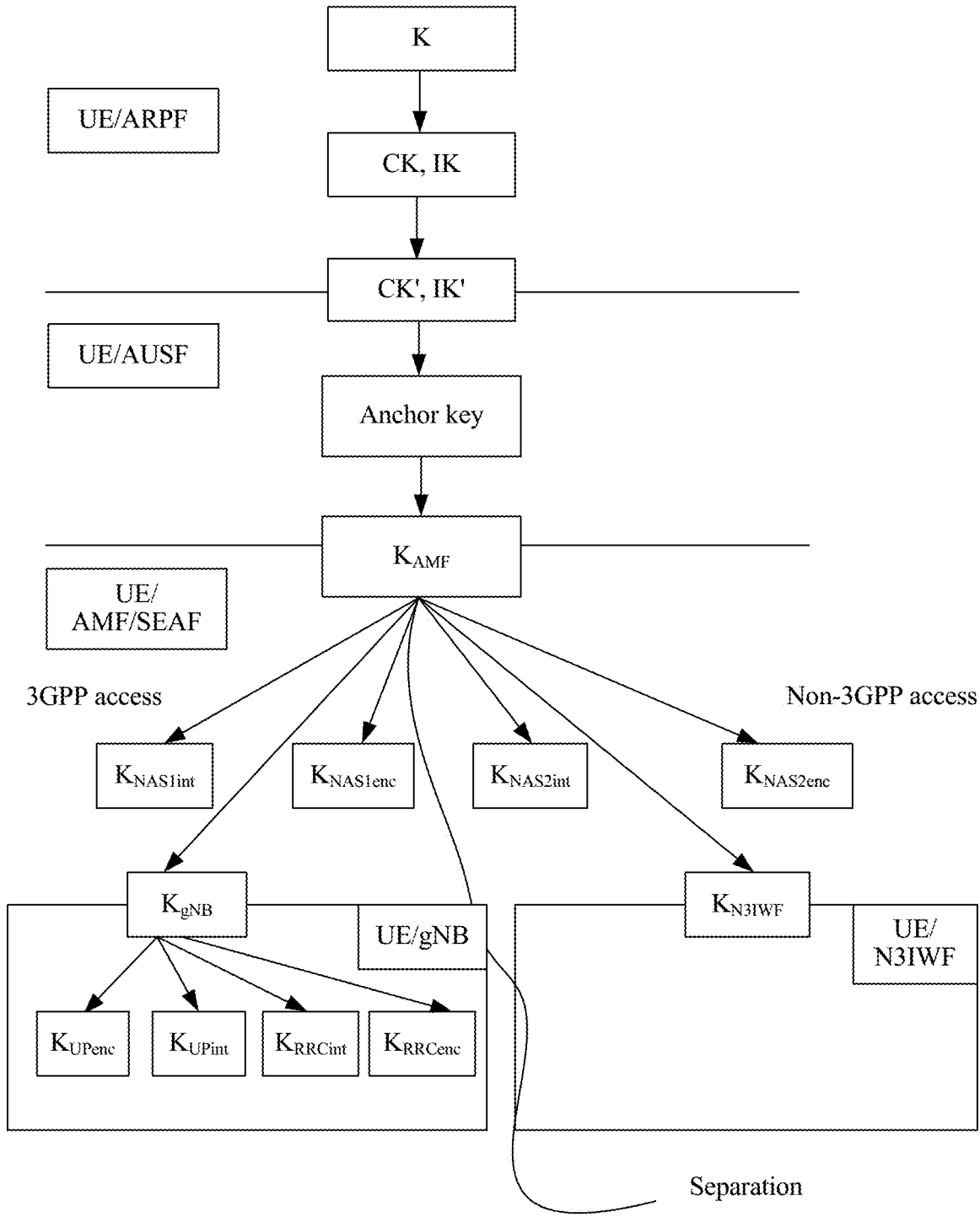
FIG. 10 is a key architectural diagram obtained by using the anchor key generation method shown in FIG. 9.

After the anchor key generation method shown in FIG. 9 is executed, a key architecture shown in FIG. 10 is to be generated. On the left of a separation line in FIG. 9, there is a key architecture corresponding to the UE and a 3GPP network, and on the right of the separation line in FIG. 10, there is a key architecture corresponding to the UE and a non-3GPP network. The key architectures can be well separated.

It may be understood that, for step 227, the AUSF may further generate two keys based on the intermediate key: an MSK' and an EMSK', respectively. The MSK' and the EMSK' are different parts of a key generated by PRF' (IK$_2$'||CK$_2$'), for example, the MSK' is the first 512 bits, and the EMSK' is the last 512 bits.

Then, the anchor key is generated based on the MSK', namely, anchor key=KDF(MSK', ANT), as described above.

The EMSK' is reserved by the AUSF or a key obtained after the AUSF performs derivation based on the EMSK' is reserved for subsequent extension.

Figure 11A:
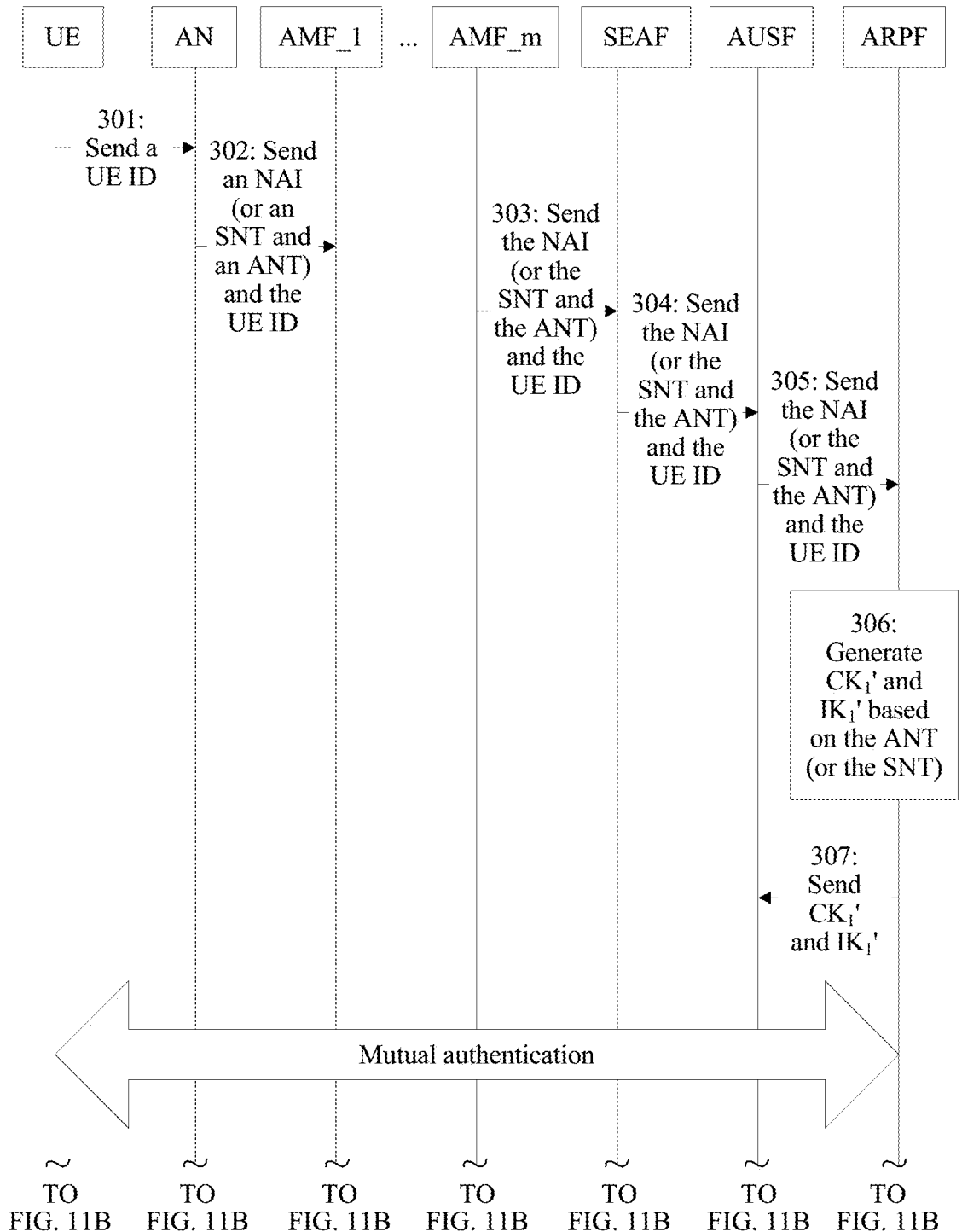
FIG. 11A and FIG. 11B are interaction diagrams of a fourth anchor key generation method according to an embodiment of this application.
Figure 11B:
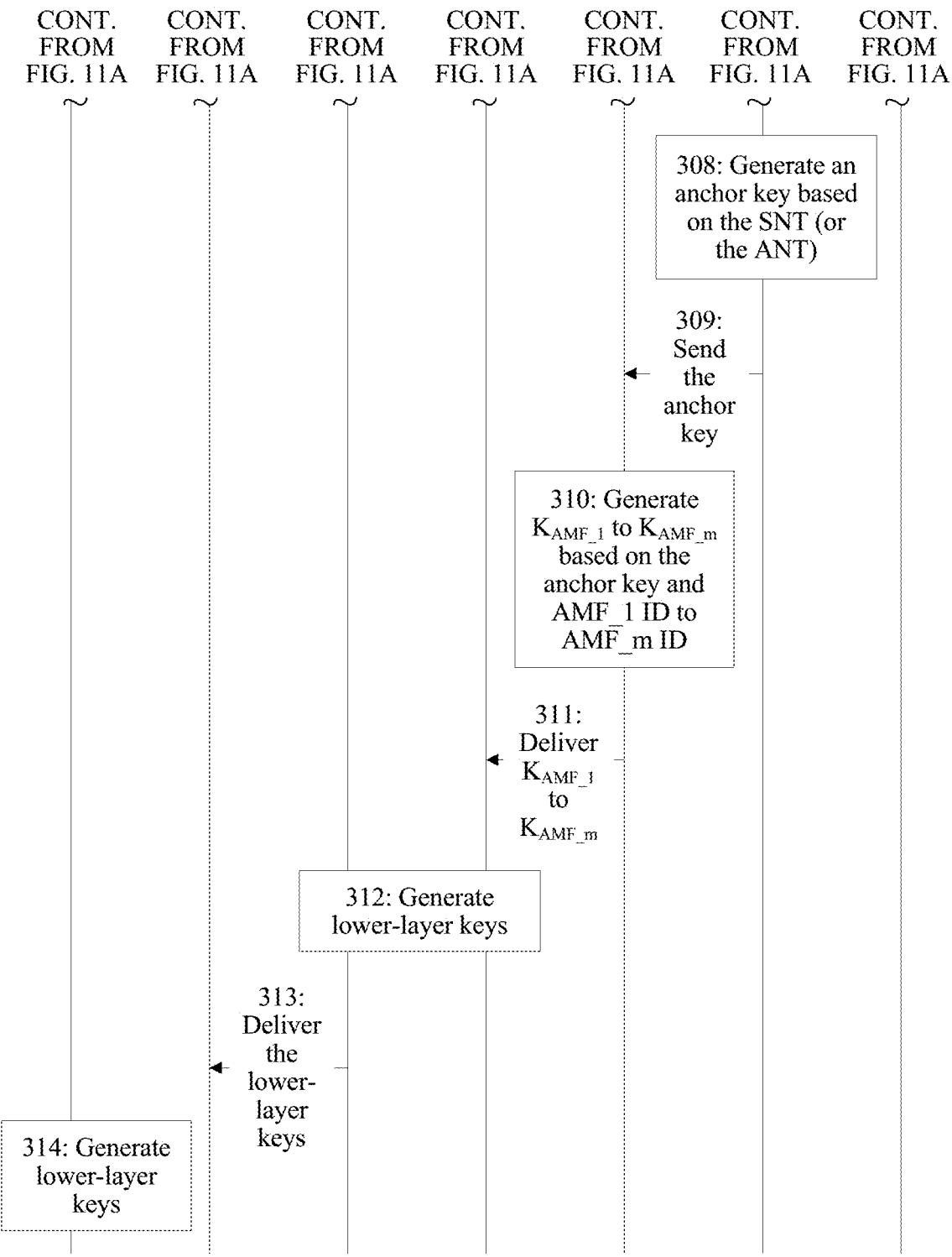

As shown in FIG. 11A and FIG. 11B, an embodiment of this application provides a fourth anchor key generation method. In this embodiment, an AUSF may be the first communications device in the claims, an SEAF may be the second communications device in claim 2, and an ARPF may be the third communications device in the claims. The method may be implemented based on the network architectures shown in FIG. 3 and FIG. 4. In addition, in this embodiment, there are m AMFs, which are named AMF_1 to AMF_m, respectively. The method includes but is not limited to the following steps.

301. UE sends a terminal identifier to an AN. Correspondingly, the AN receives the terminal identifier sent by the UE.

302. The AN sends the terminal identifier and an indication identifier to the AMF_1 to the AMF_m. Correspondingly, the AMF_1 to the AMF_m receive the terminal identifier and the indication identifier sent by the AN.

303. The AMF_1 to the AMF_m send the terminal identifier and the indication identifier to the SEAF. Correspondingly, the SEAF receives the terminal identifier and the indication identifier sent by the AMF_1 to the AMF_m.

304. The SEAF sends the terminal identifier and the indication identifier to the AUSF. Correspondingly, the AUSF receives the terminal identifier and the indication identifier sent by the SEAF.

305. The AUSF sends the terminal identifier and the indication identifier to the ARPF. Correspondingly, the ARPF receives the terminal identifier and the indication identifier sent by the AUSF.

306. The ARPF generates an intermediate key based on a cipher key CK, an integrity key IK, and an ANT.

307. The ARPF sends the intermediate key to the AUSF. Correspondingly, the AUSF receives the intermediate key sent by the ARPF.

308. The AUSF generates an anchor key based on the intermediate key.

309. The AUSF sends the anchor key to the SEAF. Correspondingly, the SEAF receives the anchor key sent by the AUSF.

310. The SEAF separately generates K$_{AMF\_1}$ to K$_{AMF\_m}$ based on the anchor key and identifiers of the AMF_1 to the AMF_m.

In this embodiment of this application, the SEAF separately generates K$_{AMF\_1}$ to K$_{AMF\_m}$ based on the following formulas:

$$K_{AMF\_1}=KDF(\text{anchor key}, AMF\_1ID);$$

$$K_{AMF\_2}=KDF(\text{anchor key}, AMF\_2ID);$$

. . .

$$K_{AMF\_m}=KDF(\text{anchor key}, AMF\_m\ ID),$$

where anchor key is the anchor key, and AMF_1 ID to AMF_m ID are the identifiers of the AMF_1 to the AMF_m respectively.

311. The SEAF delivers $K_{AMF\_1}$ to $K_{AMF\_m}$ to the AMF_1 to the AMF_m respectively. Correspondingly, the AMF_1 to the AMF_2 respectively receive $K_{AMF\_1}$ to $K_{AMF\_m}$ sent by the SEAF.

312. The AMF_1 to the AMF_m separately generate lower-layer keys based on $K_{AMF\_1}$ to $K_{AMF\_m}$.

In this embodiment of this application, the AMF_1 generates a lower-layer key 1 based on $K_{AMF\_1}$; the AMF_2 generates a lower-layer key 2 based on $K_{AMF\_2}$; ...; and the AMF_m generates a lower-layer key m based on $K_{AMF\_m}$.

That the AMF_1 generates the lower-layer key 1 based on $K_{AMF\_1}$ is used as an example for description in the following.

The AMF_1 generates a base station key $K_{gNB1}$, a 3GPP-NAS cipher key $K\text{-3GPP}_{NASenc1}$, and a 3GPP-NAS integrity protection key $K\text{-3GPP}_{NASint1}$ in a 3GPP access mode based on the following formulas:

$$K_{gNB1} = KDF(K_{AMF\_1}, \text{NAS Count1});$$

$$K\text{-3GPP}_{NASint} = KDF(K_{AMF\_1}, \text{NAS-int-alg}, \text{alg-ID});$$

$$K\text{-3GPP}_{NASenc} = KDF(K_{AMF\_1}, \text{NAS-enc-alg}, \text{alg-ID}),$$

where NAS Count1 is a count value of a NAS message passing a 3GPP access point gNB, and may be an uplink count value or may be a downlink count value, NAS-int-alg is an integrity algorithm corresponding to the NAS message, such as 'AES', 'SNOW 3G', or 'ZUC', alg-ID is an algorithm distinguisher, and NAS-enc-alg is an encryption algorithm corresponding to the NAS message, such as 'AES', 'SNOW 3G', or 'ZUC'.

313. The AMFs send the lower-layer keys to the AN.

314. The UE generates an anchor key based on a root key, and then derives a lower-layer key based on the anchor key.

Figure 12:
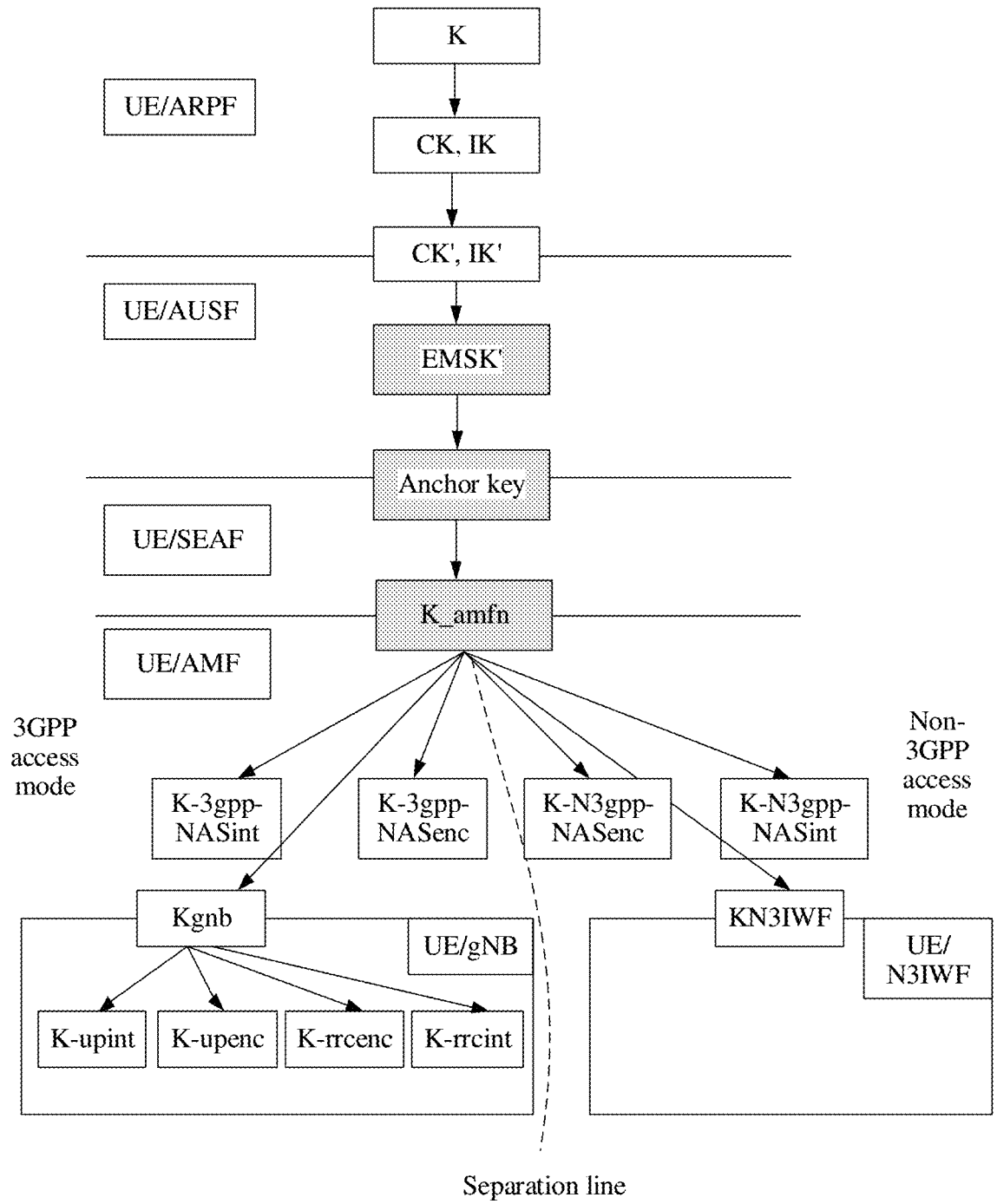
FIG. 12 is a key architectural diagram obtained by using the anchor key generation method shown in FIG. 11A and FIG. 11B.

After the anchor key generation method shown in FIG. 11A and FIG. 11B is executed, a key architecture shown in FIG. 12 is to be generated. On the left of a separation line in FIG. 12, there is a key architecture corresponding to the UE and a 3GPP network, and on the right of the separation line in FIG. 12, there is a key architecture corresponding to the UE and a non-3GPP network. The key architectures can be well separated.

It may be understood that the embodiments shown in FIG. 8, FIG. 9, and FIG. 11A and FIG. 11B evolve based on the embodiment shown in FIG. 5. For brevity, the embodiments shown in FIG. 8, FIG. 9, and FIG. 11A and FIG. 11B describe only a part that is different from the embodiment shown in FIG. 5. For a part that is in the embodiments shown in FIG. 8, FIG. 9, and FIG. 11A and FIG. 11B and that is the same as that in the embodiment shown in FIG. 5, refer to FIG. 5 and related content. Details are not described herein again.

Figure 13:
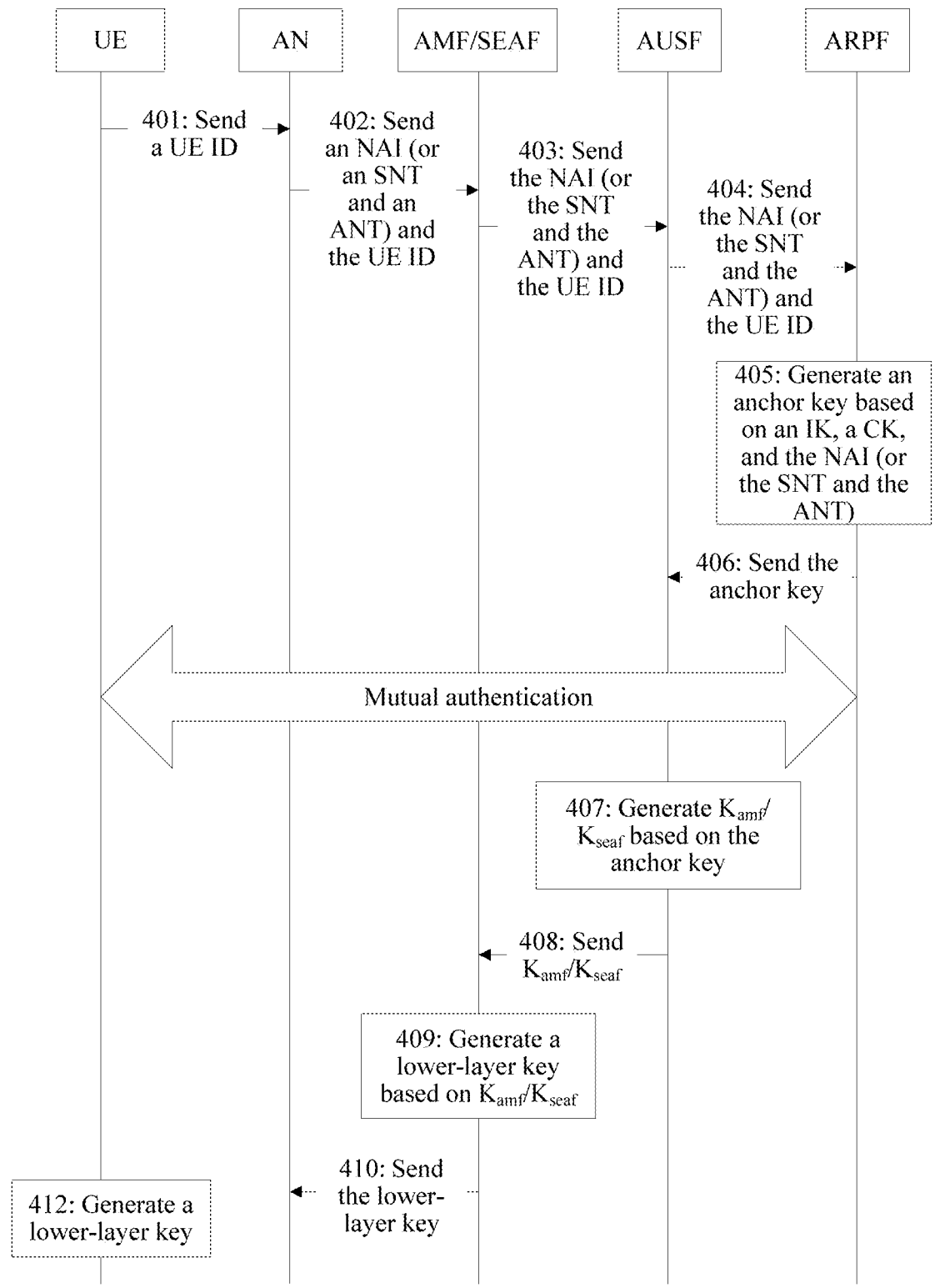
FIG. 13 is an interaction diagram of a fifth anchor key generation method according to an embodiment of this application.

As shown in FIG. 13, an embodiment of this application provides a fifth anchor key generation method. The method may be implemented based on the network architectures shown in FIG. 3 and FIG. 4, and the method includes but is not limited to the following steps.

401. UE sends a terminal identifier to an AN. Correspondingly, the AN receives the terminal identifier sent by the UE.

In this embodiment of this application, the terminal identifier may be a fixed identifier, for example, a media access control (MAC) address, an Internet Protocol (IP) address, a mobile number, an international mobile equipment identity (International Mobile Equipment Identity, IMEI), an international mobile subscriber identity (IMSI), an IP multimedia private identity (IMPI), or an IP multimedia public identity (IMPU); or may be a temporarily allocated identifier, for example, a temporary mobile subscriber identity (TMSI) or a globally unique temporary UE identity (GUTI).

It may be understood that, in addition to the terminal identifier, the UE may send, to the AN, at least one of an access network parameter, a registration type, a security parameter, a 5G network capability of the UE, or a PDU session status. The access network parameter may be a parameter related to a service network, such as a frequency of an access network, a temporary user identity, or NSSAI. The registration type may indicate that a user is performing initial registration, registration caused by a movement, a periodic registration update, or the like, in order to distinguish between user registration behaviors. The security parameter is a parameter related to authentication and integrity protection. The NSSAI is short for network slice selection assistance information. The 5G network capability of the UE may include a configuration capability that supports access to the network. The PDU session is a service connection of a PDU between the UE and a data network, and a type of the service connection may be an IP or Ethernet service connection.

402. The AN sends the terminal identifier and an indication identifier to an AMF (or an SEAF). Correspondingly, the AMF (or the SEAF) receives the terminal identifier and the indication identifier sent by the AN.

In this embodiment of this application, the indication identifier is used to indicate an access mode of a terminal. In a 5G standard, the access mode of the terminal may be classified based on different classification bases. For example, the classification bases of the access mode may include an access type and an operator type. The access type may be classified into a 3GPP access type, a trusted non-3GPP access type, and an untrusted non-3GPP access type. The operator type may be classified into an operator type A or an operator type B. It may be understood that there may be more operator types. The operator types are merely examples herein, and are not specifically limited.

For example, the classification bases include the access type and the operator type. Classification of the access mode may be shown in Table 1. It should be noted that the classification bases are not limited to the foregoing two types of classification bases. The classification basis of the access mode may be another type of classification basis, for example, a medium type (wired access or wireless access). This is not specifically limited herein. In addition, the classification bases are not limited to the two classification bases: the access type and the operator type. There may be one, three, four, or more classification bases of the access mode, that is, the access mode may be classified by more dimensions or fewer dimensions.

The indication identifier may be carried in the access network parameter. The indication identifier may be any one of the following manners. The indication identifier may be a network access identifier (NAI), used to indicate both an access type and an operator type. Alternatively, the indication identifier may include an access type identifier and an operator type identifier, where the access type identifier is used to indicate the access type, and the operator type identifier is used to indicate the operator type. It may be understood that the foregoing example is merely used as an example, and does not constitute a specific limitation.

In some possible implementations, the network access identifier may be an SN identity | an access network identity, that is, may particularly indicate a type of access of an operator, for example, WLAN access of China Unicom. The SN identity herein is defined in a 4G network, and the access network identity is defined in a non-3GPP network in 4G. It is also possible to upgrade the SN identity or access network identity mode, such that it can represent a particular access type of a particular operator.

In some possible implementations, the access type identifier indicates that the access type is a 3GPP access type, a trusted non-3GPP access type, and an untrusted non-3GPP access type. For example, the access type identifier access network type (ANT) may be directly character strings such as "3GPP network", "Trusted Non-3GPP network", and "Untrusted Non-3GPP network", or may be only character strings such as "3GPP network" and "Non-3GPP network".

In some possible implementations, the operator type identifier may include two parts, where one part is used to indicate an operator, and the other part is used to indicate a specific access type. For example, the operator type identifier may indicate LTE access of China Mobile or WLAN access of China Unicom. In application, a combination of the SN Identity and the Access Network Identity may be used as an operator type identifier. Alternatively, the operator type identifier may only indicate an operator, such as China Mobile, China Unicom, and China Telecom.

In some possible implementations, it may be possible that the indication identifier is only an operator type identifier.

In some possible implementations, it may be possible that the indication identifier is only an access type identifier.

403. The AMF (or the SEAF) sends the terminal identifier and the indication identifier to an AUSF. Correspondingly, the AUSF receives the terminal identifier and the indication identifier sent by the AMF (or the SEAF).

404. The AUSF sends the terminal identifier and the indication identifier to an ARPF. Correspondingly, the ARPF receives the terminal identifier and the indication identifier sent by the AUSF.

405. The ARPF generates an anchor key based on a cipher key CK, an integrity key IK, and the indication identifier.

In this embodiment of this application, the ARPF may generate the anchor key in the following several manners.

In a first manner, the ARPF generates the anchor key based on the following formula: anchor key=KDF (SQN⊕AK, NAI, CK∥IK), where anchor key is the anchor key, KDF is a key generation algorithm, SQN is a latest sequence number, NAI is the indication identifier, CK is an initial cipher key, IK is an initial integrity key, AK is an anonymity key, CK=f3(RAND), IK=f4(RAND), AK=f5 (RAND), RAND is a random number, f3, f4, and f5 are generation algorithms, and ⊕ means an exclusive OR operation.

In a second manner, the ARPF generates the anchor key based on the following formula: anchor key=KDF (SQN⊕AK, ANT, SNT, CK∥IK), where anchor key is the anchor key, KDF is a key generation algorithm, SQN is a latest sequence number, ANT is the access type identifier, SNT is the operator type identifier, CK is an initial cipher key, IK is an initial integrity key, AK is an anonymity key, CK=f3(RAND), IK=f4(RAND), AK=f5(RAND), RAND is a random number, f3, f4, and f5 are generation algorithms, and ⊕ means an exclusive OR operation.

In some possible implementations, SQN may be a latest sequence number generated by an AuC, and after generating SQN, the AuC sends SQN to the ARPF. Similarly, RAND may be a random number generated by the AuC, and after generating RAND, the AuC sends RAND to the ARPF. In addition to the foregoing manner, SQN and RAND may also be generated by another communications device in the network architecture and sent to the ARPF. SQN and RAND may be even generated by the ARPF itself. This is not specifically limited herein.

In some possible implementations, CK may be generated by the AuC based on a formula CK=f3(RAND), IK may be generated by the AuC based on a formula IK=f4(RAND), and AK may be generated by the AuC based on a formula AK=f5(RAND). In addition to the foregoing manner, CK, IK, and AK may also be generated by another communications device in the network architecture and sent to the ARPF. CK, IK, and AK may be even generated by the ARPF itself. This is not specifically limited herein.

406. The ARPF sends the anchor key to the AUSF. Correspondingly, the AUSF receives the anchor key sent by the ARPF.

407. The AUSF generates $K_{amf}/K_{seaf}$ based on the anchor key.

In this embodiment of this application, the AUSF generates $K_{amf}/K_{seaf}$ based on the following formulas:

$$K_{amf}=KDF(\text{anchor key}, AMF \text{ ID});$$

$$K_{seaf}=KDF(\text{anchor key}, SEAF \text{ ID}),$$

where anchor key is the anchor key, KDF is a key generation algorithm, AMF ID is an identifier of the AMF, and SEAF ID is an identifier of the SEAF. The identifier of the AMF may be a MAC address, an IP address, or the like of the AMF, and the identifier of the SEAF may be a MAC address, an IP address, or the like of the SEAF.

408. The AUSF sends $K_{amf}/K_{seaf}$ to the AMF (or the SEAF). Correspondingly, the AMF (or the SEAF) receives $K_{amf}/K_{seaf}$ sent by the AUSF.

409. The AMF (or the SEAF) generates a lower-layer key based on $K_{amf}/K_{seaf}$. The lower-layer key is a key obtained by performing one or more times of derivation based on the anchor key.

410. The AMF (or the SEAF) sends the lower-layer key to the AN.

411. The UE generates through derivation by itself a lower-layer key based on a CK, an IK, and an indication identifier. It may be understood that a process of deriving, by the UE, the lower-layer key is substantially similar to the foregoing process, and details are not described herein again.

It may be understood that after generating the anchor key, the AUSF may also directly send the anchor key to the AMF, and then the AMF generates the lower-layer key based on the anchor key and sends the lower-layer key to the AN.

It should be noted that, when access modes are different, step 409 to step 411 are different. The following provides detailed description by separately using an example that the access mode is a 3GPP access mode and an example that the access mode is a non-3GPP access mode.

Figure 14A:
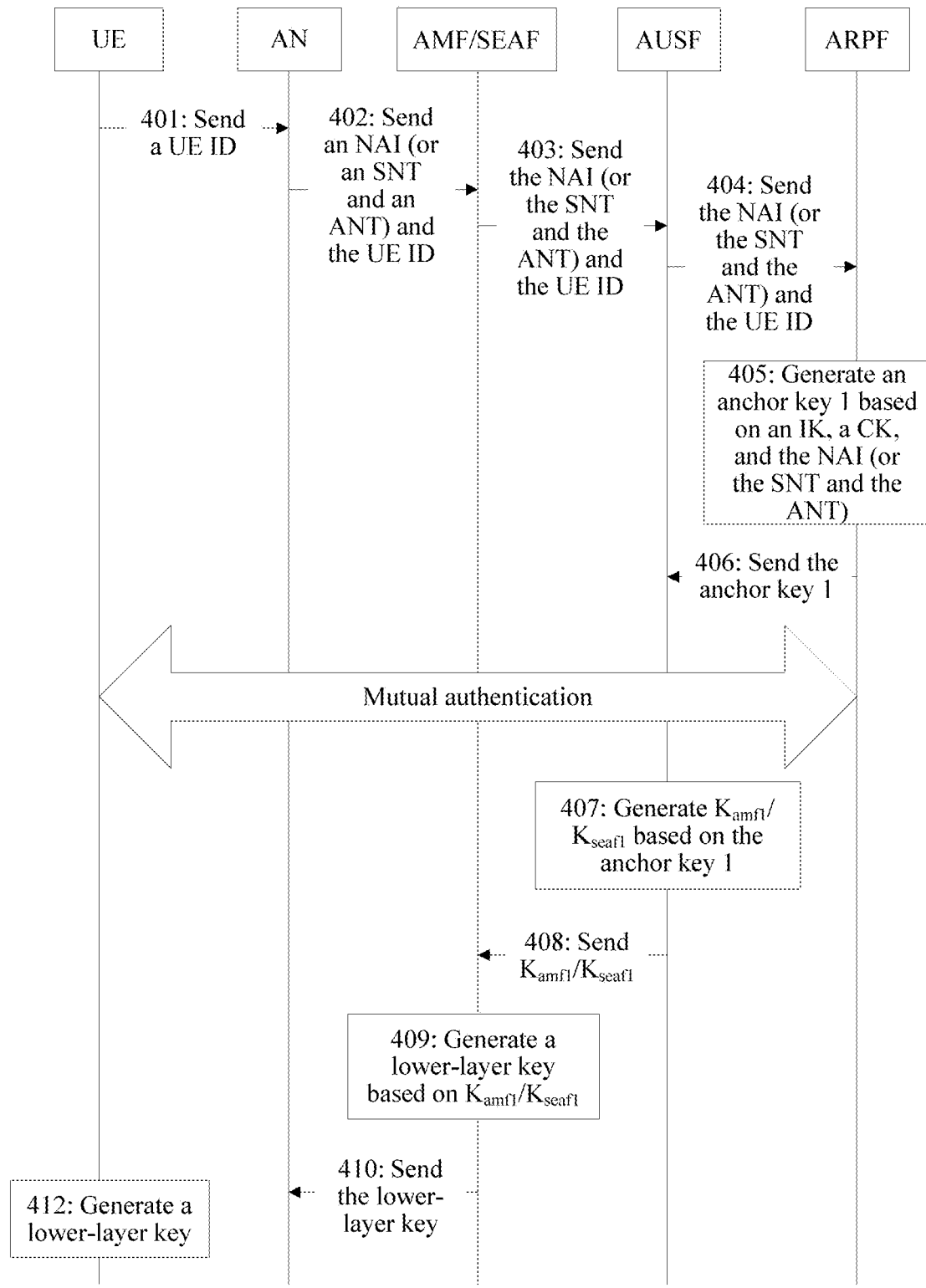
FIG. 14A and FIG. 14B are interaction diagrams of the anchor key generation method shown in FIG. 13 in a 3GPP mode and in a non-3GPP mode, respectively.

As shown in FIG. 14A, it is assumed that the access mode is the 3GPP access mode, and the anchor key is an anchor key 1. Then, step 409 to step 411 may be replaced with the following steps 4111 to 4117.

4111. The AMF (or the SEAF) generates a base station key $K_{gNB}$, a 3GPP-NAS cipher key $K\text{-}3GPP_{NASenc}$, and a 3GPP-NAS integrity protection key $K\text{-}3GPP_{NASint}$ based on $K_{amf1}/K_{seaf1}$.

In some embodiments, the AMF (or the SEAF) generates the base station key $K_{gNB}$, the 3GPP-NAS cipher key $K\text{-}3GPP_{NASenc}$, and the 3GPP-NAS integrity protection key $K\text{-}3GPP_{NASint}$ in the 3GPP access mode based on the following formulas:

$$K_{gNB}=KDF(K_{amf1} \text{ and/or } Kseaf1, \text{NAS Count1});$$

$$K\text{-}3GPP_{NASint}=KDF(K_{amf1} \text{ and/or } Kseaf1, \text{NAS-int-alg,alg-ID});$$

$$K\text{-}3GPP_{NASenc}=KDF(K_{amf1} \text{ and/or } Kseaf1,\text{NAS-enc-alg,alg-ID}),$$

where NAS Count1 is a count value of a NAS message passing a 3GPP access point gNB, and may be an uplink count value or may be a downlink count value, NAS-int-alg is an integrity algorithm corresponding to the NAS message, such as 'AES', 'SNOW 3G', or 'ZUC', alg-ID is an algorithm distinguisher, and NAS-enc-alg is an encryption algorithm corresponding to the NAS message, such as 'AES', 'SNOW 3G', or 'ZUC'.

4113. The AMF (or the SEAF) sends the base station key $K_{gNB}$ to the AN. In this case, the AN correspondingly receives the base station key $K_{gNB}$ sent by the AMF (or the SEAF).

4115. The AN generates a user plane cipher key $K_{UPenc}$, a user plane integrity key $K_{UPint}$, a control plane cipher key $K_{RRCenc}$, and a control plane integrity key $K_{RRCint}$ based on the base station key $K_{gNB}$.

In this embodiment of this application, the AN separately generates the user plane cipher key $K_{UPenc}$, the user plane integrity key $K_{UPint}$, the control plane cipher key $K_{RRCenc}$, and the control plane integrity key $K_{RRCint}$ based on the following formulas:

$$K_{UPenc}=KDF(K_{gNB},\text{UP-enc-alg,alg-ID});$$

$$K_{UPin}=KDF(K_{gNB},\text{UP-int-alg,alg-ID});$$

$$K_{RRCenc}=KDF(K_{gNB},\text{RRC-enc-alg,alg-ID});$$

$$K_{RRCint}=KDF(K_{gNB},\text{RRC-int-alg,alg-ID}),$$

where KDF is a key generation algorithm, $K_{gNB}$ is the base station key, alg-ID is an algorithm distinguisher; and for definitions of UP-enc-alg, UP-int-alg, RRC-enc-alg, and RRC-int-alg, refer to the algorithm distinguisher definition table in 4G shown in Table 2.

4117. The UE derives an anchor key by itself based on a CK, an IK, and an indication identifier, and then derives by itself a user plane cipher key $K_{UPenc}$, a user plane integrity key $K_{UPint}$, a control plane cipher key $K_{RRCenc}$, and a control plane integrity key $K_{RRCint}$ based on the anchor key.

Figure 14B:
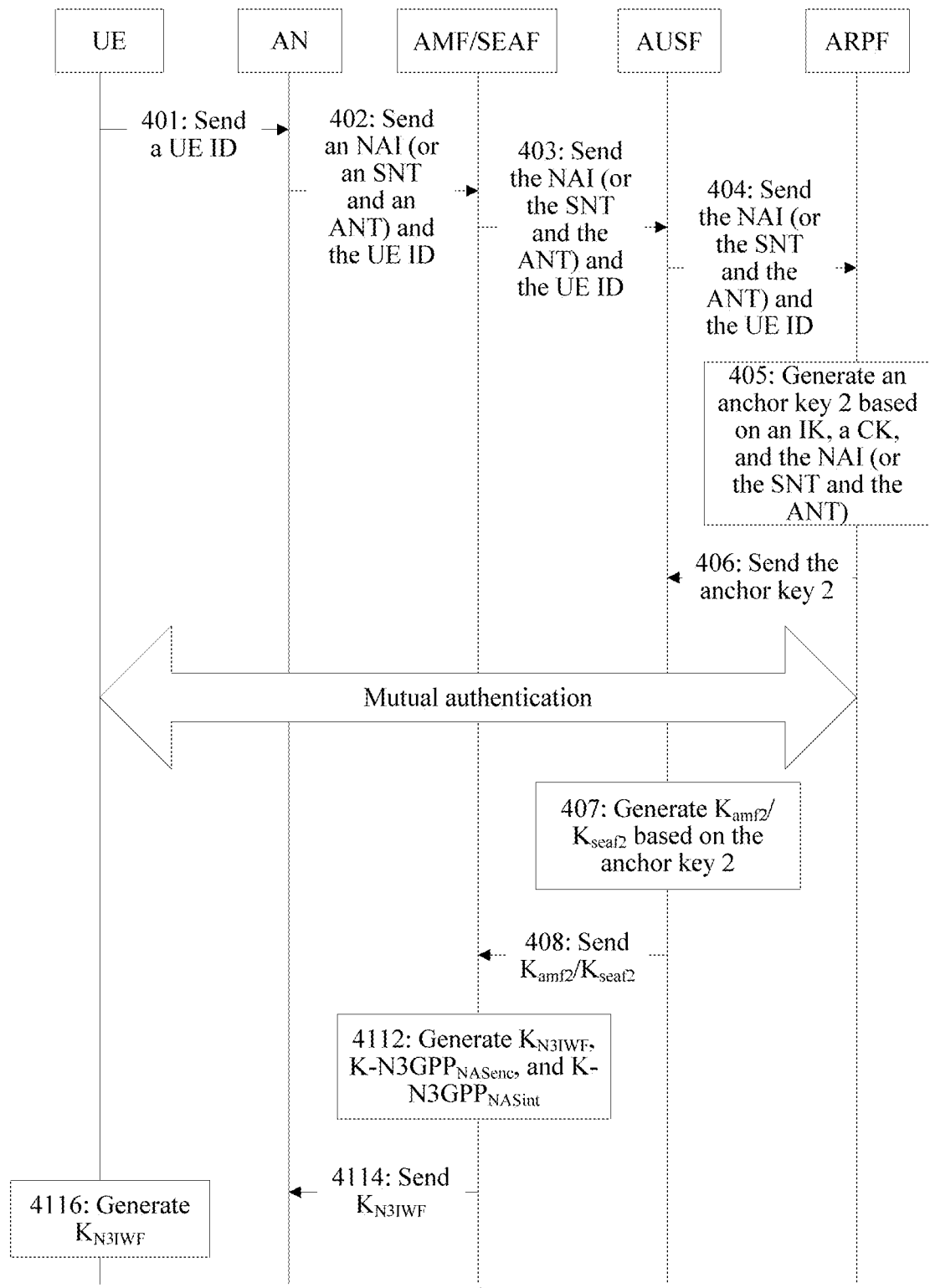

As shown in FIG. 14B, it is assumed that the access mode is the non-3GPP access mode, and the anchor key is an anchor key 2. Then, step 409 to step 411 may be replaced with the following steps 4112 to 4116.

4112. The AMF (or the SEAF) generates an access point key $K_{N3IWF}$, a non-3GPP-NAS cipher key K-N3GPP$_{NASenc}$, and a non-3GPP-NAS integrity protection key K-N3GPP$_{NASint}$ based on the anchor key anchor key 2.

In some embodiments, the AMF (or the SEAF) then generates the access point key $K_{N3IWF}$, the non-3GPP-NAS cipher key K-N3GPP$_{NASenc}$, and the non-3GPP-NAS integrity protection key K-N3GPP$_{NASint}$ in the non-3GPP access mode based on the following formulas:

$$K_{N3IWF}=KDF(K_{amf2} \text{ and/or } K_{seaf2},\text{NAS Count2});$$

$$K\text{-}N3GPP_{NASint}=KDF(K_{amf2} \text{ and/or } K_{seaf2},\text{NAS-int-alg,alg-ID});$$

$$K\text{-}N3GPP_{NASenc}=KDF(K_{amf2} \text{ and/or } K_{seaf2},\text{NAS-enc-alg,alg-ID}),$$

where NAS Count2 is a count value of a NAS message passing a non-3GPP access point N3IWF, and may be an uplink count value or may be a downlink count value, NAS-int-alg is an integrity algorithm corresponding to the NAS message, such as 'AES', 'SNOW 3G', or 'ZUC', alg-ID is an algorithm distinguisher, and NAS-enc-alg is an encryption algorithm corresponding to the NAS message, such as 'AES', 'SNOW 3G', or 'ZUC'.

4114. The AMF (or the SEAF) sends the access point key $K_{N3IWF}$ to the AN. In this case, the AN correspondingly receives the access point key $K_{N3IWF}$ sent by the AMF (or the SEAF).

4116. The UE derives by itself an anchor key based on a CK, an IK, and an indication identifier, and then derives by itself an access point key $K_{N3IWF}$ based on the anchor key.

It may be understood that, the key generation algorithm in the embodiment shown in FIG. 13 is not limited to the KDF algorithm. In application, the key generation algorithm may be another algorithm, such as a Trunc algorithm: a Trunc algorithm for truncating least significant bits, or another HASH algorithm. This is not specifically limited in this application. In addition, an independent variable of the key generation algorithm may also include another parameter, such as NSSAI, a random number, a nonce, a sequence number, a registration type, an access stratum message count, a security algorithm distinguisher, a security identifier, a length of SQN $\oplus$ AK, or a length corresponding to a parameter used for generating a key. In application, one or more parameters may be selected therefrom based on requirements as independent variables of the key generation algorithm.

Figure 15:
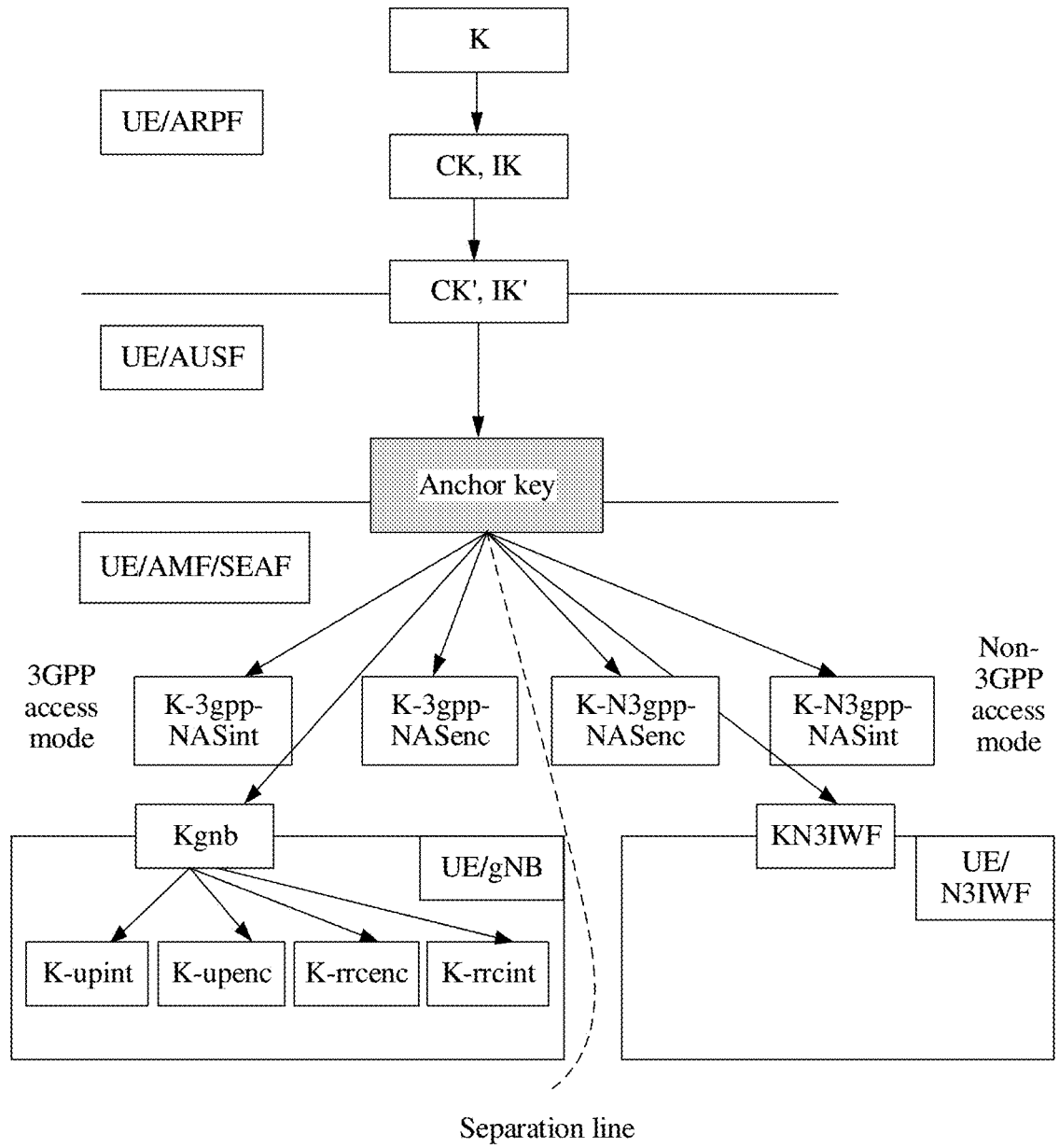
FIG. 15 is a key architectural diagram obtained by using the anchor key generation method shown in FIG. 13.

After the anchor key generation method shown in FIG. 13 is executed, a key architecture shown in FIG. 15 is to be generated. On the left of a separation line in FIG. 15, there is a key architecture generated by performing the process shown in FIG. 14A. On the right of the separation line in FIG. 15, there is a key architecture generated by performing the process shown in FIG. 14B. The two key architectures can be well separated.

Figure 16:
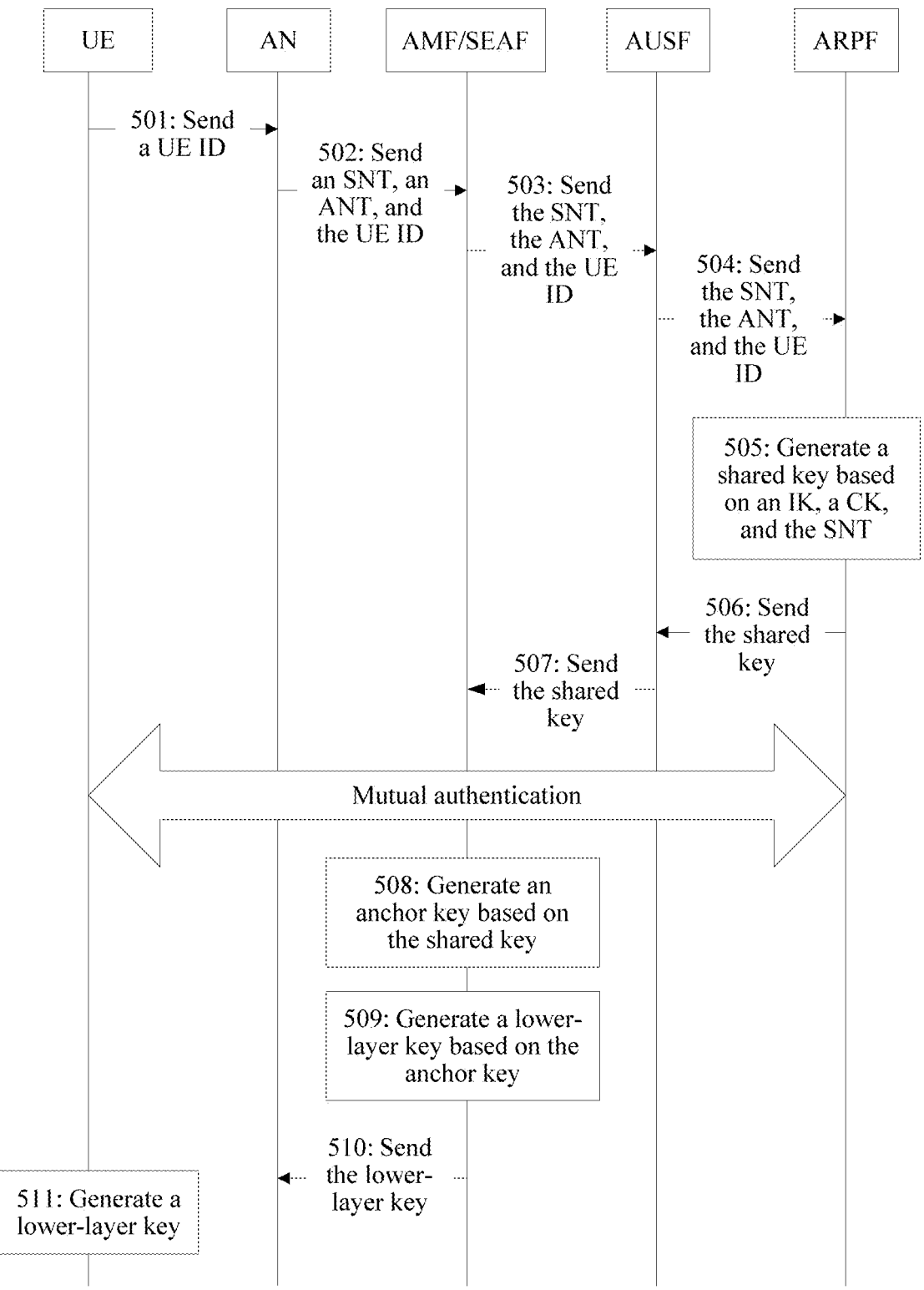
FIG. 16 is an interaction diagram of a sixth anchor key generation method according to an embodiment of this application.

As shown in FIG. 16, an embodiment of this application provides a sixth anchor key generation method. The method may be implemented based on the network architectures shown in FIG. 3 and FIG. 4, and the method includes but is not limited to the following steps.

501. UE sends a terminal identifier to an AN. Correspondingly, the AN receives the terminal identifier sent by the UE.

In this embodiment of this application, the terminal identifier may be a fixed identifier, for example, a media access control (MAC) address, an Internet Protocol (IP) address, a mobile number, an international mobile equipment identity (International Mobile Equipment Identity, IMEI), an international mobile subscriber identity (IMSI), an IP multimedia private identity (IMPI), or an IP multimedia public identity (IMPU); or may be a temporarily allocated identifier, for example, a temporary mobile subscriber identity (TMSI) or a globally unique temporary UE identity (GUTI).

It may be understood that, in addition to the terminal identifier, the UE may send, to the AN, at least one of an access network parameter, a registration type, a security parameter, a 5G network capability of the UE, or a PDU session status. The access network parameter may be a parameter related to a service network, such as a frequency of an access network, a temporary user identity, or NSSAI. The registration type may indicate that a user is performing initial registration, registration caused by a movement, a periodic registration update, or the like, in order to distinguish between user registration behaviors. The security parameter is a parameter related to authentication and integrity protection. The NSSAI is short for network slice selection assistance information. The 5G network capability of the UE may include a configuration capability that supports access to the network. The PDU session is a service connection of a PDU between the UE and a data network, and a type of the service connection may be an IP or Ethernet service connection.

502. The AN sends the terminal identifier and an indication identifier to an AMF (or an SEAF). Correspondingly, the AMF (or the SEAF) receives the terminal identifier and the indication identifier sent by the AN.

In this embodiment of this application, the indication identifier is used to indicate an access mode of a terminal. In a 5G standard, the access mode of the terminal may be classified based on different classification bases. For example, the classification bases of the access mode may include an access type and an operator type. The access type may be classified into a 3GPP access type, a trusted non-3GPP access type, and an untrusted non-3GPP access type. The operator type may be classified into an operator type A or an operator type B. It may be understood that there may be more operator types. The operator types are merely examples herein, and are not specifically limited.

For example, the classification bases include an access type and an operator type. Classification of the access mode may be shown in Table 1. It should be noted that the classification bases are not limited to the foregoing two types of classification bases. The classification basis of the access mode may be another type of classification basis, for example, a medium type (wired access or wireless access). This is not specifically limited herein. In addition, the classification bases are not limited to the two classification bases: the access type and the operator type. There may be one, three, four, or more classification bases of the access mode, that is, the access mode may be classified by more dimensions or fewer dimensions.

The indication identifier may be carried in the access network parameter. The indication identifier may include an access type identifier and an operator type identifier, where the access type identifier is used to indicate the access type, and the operator type identifier is used to indicate the operator type. It may be understood that the foregoing example is merely used as an example, and does not constitute a specific limitation.

In some possible implementations, the access type identifier indicates that the access type is a 3GPP access type, a trusted non-3GPP access type, and an untrusted non-3GPP access type. For example, the access type identifier access network type (ANT) may be directly character strings such as "3GPP network", "Trusted Non-3GPP network", and "Untrusted Non-3GPP network", or may be only character strings such as "3GPP network" and "Non-3GPP network".

In some possible implementations, the operator type identifier may include two parts: One part is used to indicate an operator, and the other part is used to indicate a specific access type. For example, the operator type identifier may indicate LTE access of China Mobile or WLAN access of China Unicom. In application, a combination of the SN Identity and the Access Network Identity may be used as an operator type identifier. Alternatively, the operator type identifier may only indicate an operator, such as China Mobile, China Unicom, and China Telecom.

In some possible implementations, it may be possible that the indication identifier is only an operator type identifier.

In some possible implementations, it may be possible that the indication identifier is only an access type identifier.

503. The AMF (or the SEAF) sends the terminal identifier and the indication identifier to an AUSF. Correspondingly, the AUSF receives the terminal identifier and the indication identifier sent by the AMF (or the SEAF).

504. The AUSF sends the terminal identifier and the indication identifier to an ARPF. Correspondingly, the ARPF receives the terminal identifier and the indication identifier sent by the AUSF.

505. The ARPF generates a shared key based on a cipher key CK, an integrity key IK, and the indication identifier.

In this embodiment of this application, the ARPF may generate the shared key in the following several manners.

In a first manner, the ARPF generates the shared key based on the following formula: shared key=KDF (SQN⊕AK, ANT, CK∥IK), where KDF is a key generation algorithm, SQN is a latest sequence number, ANT is the access type identifier, CK is an initial cipher key, IK is an initial integrity key, AK is an anonymity key, CK=f3 (RAND), IK=f4(RAND), AK=f5(RAND), RAND is a random number, f3, f4, and f5 are generation algorithms, and ⊕ means an exclusive OR operation.

In a second manner, the ARPF generates the shared key based on the following formula: shared key=KDF (SQN⊕AK, SNT, CK∥IK), where KDF is a key generation algorithm, SQN is a latest sequence number, SNT is the operator type identifier, CK is an initial cipher key, IK is an initial integrity key, AK is an anonymity key, CK=f3 (RAND), IK=f4(RAND), AK=f5(RAND), RAND is a random number, f3, f4, and f5 are generation algorithms, and ⊕ means an exclusive OR operation.

In some possible implementations, SQN may be a latest sequence number generated by an AuC, and after generating SQN, the AuC sends SQN to the ARPF. Similarly, RAND may be a random number generated by the AuC, and after generating RAND, the AuC sends RAND to the ARPF. In addition to the foregoing manner, SQN and RAND may also be generated by another communications device in the network architecture and sent to the ARPF. SQN and RAND may be even generated by the ARPF itself. This is not specifically limited herein.

In some possible implementations, CK may be generated by the AuC based on a formula CK=f3(RAND), IK may be generated by the AuC based on a formula IK=f4(RAND), and AK may be generated by the AuC based on a formula AK=f5(RAND). In addition to the foregoing manner, CK, IK, and AK may also be generated by another communications device in the network architecture and sent to the ARPF. CK, IK, and AK may be even generated by the ARPF itself. This is not specifically limited herein.

506. The ARPF sends the shared key to the AUSF. Correspondingly, the AUSF receives the shared key sent by the ARPF.

507. The AUSF sends the shared key to the AMF (or the SEAF). Correspondingly, the AMF (or the SEAF) receives the shared key sent by the AUSF.

508. The AMF (or the SEAF) generates an anchor key based on the shared key.

For the first manner of generating the shared key in step 505, the AMF generates the anchor key based on the shared key in the following manner: anchor key=KDF(shared key, SNT), where anchor key is the anchor key, KDF is a key generation algorithm, and SNT is the operator type identifier.

For the second manner of generating the shared key in step 505, the AMF generates the anchor key based on the shared key in the following manner: anchor key=KDF (shared key, ANT), where anchor key is the anchor key, KDF is a key generation algorithm, and ANT is the access type identifier.

509. The AMF (or the SEAF) generates a lower-layer key based on the anchor key. The lower-layer key is a key obtained by performing one or more times of derivation based on the anchor key.

It may be understood that a process in which the AMF (or the SEAF) generates the lower-layer key based on a key $K_{amf}$/a key $K_{seaf}$ is basically the same as the processes shown in FIG. 6A and FIG. 6B. For details, refer to FIG. 6A and FIG. 6B and related content. Details are not described herein again.

510. The AMF (or the SEAF) sends the lower-layer key to the AN.

511. The UE generates a lower-layer key based on an AK, an IK, an SNT, and an ANT. It may be understood that a process of deriving, by the UE, the lower-layer key is substantially similar to the foregoing process, and details are not described herein again.

It should be noted that, when access modes are different, step 509 to step 511 are different. The following provides detailed description by separately using an example that the access mode is a 3GPP access mode and an example that the access mode is a non-3GPP access mode.

Figure 17A:
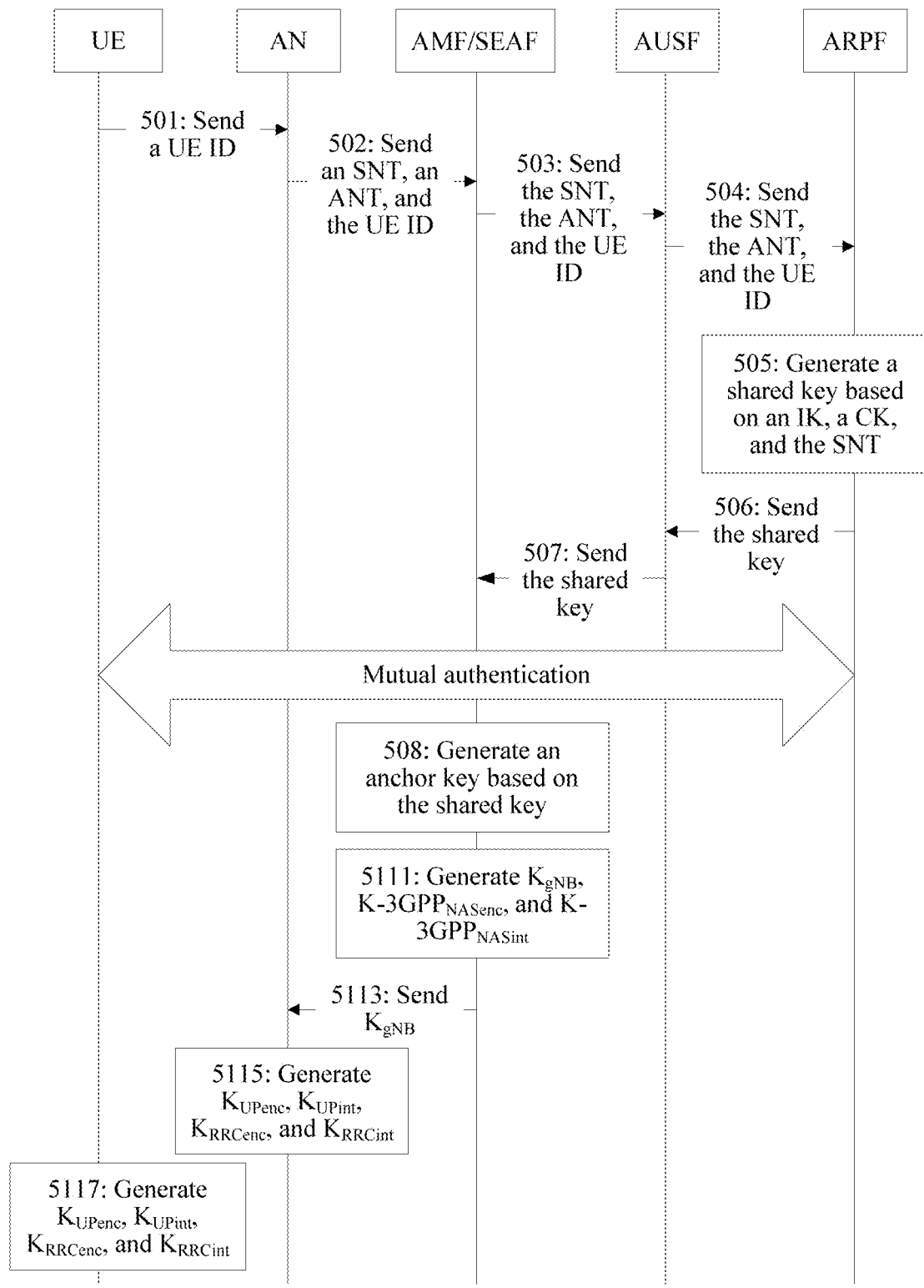
FIG. 17A and FIG. 17B are interaction diagrams of the anchor key generation method shown in FIG. 16 in a 3GPP mode and in a non-3GPP mode, respectively.

As shown in FIG. 17A, it is assumed that the access mode is the 3GPP access mode, and the anchor key is an anchor key 1. Then, step 509 to step 511 may be replaced with the following steps S111 to S117.

5111. The AMF (or the SEAF) generates a base station key $K_{gNB}$, a 3GPP-NAS cipher key K-3GPP$_{NASenc}$, and a 3GPP-NAS integrity protection key K-3GPP$_{NASint}$ based on the anchor key 1.

In some embodiments, the AMF (or the SEAF) generates the base station key $K_{gNB}$, the 3GPP-NAS cipher key K-3GPP$_{NASenc}$, and the 3GPP-NAS integrity protection key K-3GPP$_{NASint}$ in the 3GPP access mode based on the following formulas:

$$K_{gNB}=KDF(\text{anchor key1,NAS Count1});$$

$$K\text{-3GPP}_{NASint}=KDF(\text{anchor key1,NAS-int-alg,alg-ID});$$

$$K\text{-3GPP}_{NASenc}=KDF(\text{anchor key1,NAS-enc-alg,alg-ID}),$$

where NAS Count1 is a count value of a NAS message passing a 3GPP access point gNB, and may be an uplink count value or may be a downlink count value, NAS-int-alg is an integrity algorithm corresponding to the NAS message, such as 'AES', 'SNOW 3G', or 'ZUC', alg-ID is an algorithm distinguisher, and NAS-enc-alg is an encryption algorithm corresponding to the NAS message, such as 'AES', 'SNOW 3G', or 'ZUC'.

5113. The AMF (or the SEAF) sends the base station key $K_{gNB}$ to the AN. In this case, the AN correspondingly receives the base station key $K_{gNB}$ sent by the AMF (or the SEAF).

5115. The AN generates a user plane cipher key $K_{UPenc}$, a user plane integrity key $K_{UPint}$, a control plane cipher key $K_{RRCenc}$, and a control plane integrity key $K_{RRCint}$ based on the base station key $K_{gNB}$.

In this embodiment of this application, the AN separately generates the user plane cipher key $K_{UPenc}$, the user plane integrity key $K_{UPint}$, the control plane cipher key $K_{RRCenc}$, and the control plane integrity key $K_{RRCint}$ based on the following formulas:

$$K_{UPenc}=KDF(K_{gNB},\text{UP-enc-alg,alg-ID});$$

$$K_{UPin}=KDF(K_{gNB},\text{UP-int-alg,alg-ID});$$

$$K_{RRCenc}=KDF(K_{gNB},\text{RRC-enc-alg,alg-ID});$$

$$K_{RRCint}=KDF(K_{gNB},\text{RRC-int-alg,alg-ID}),$$

where KDF is a key generation algorithm, $K_{gNB}$ is the base station key, alg-ID is an algorithm distinguisher; and for definitions of UP-enc-alg, UP-int-alg, RRC-enc-alg, and RRC-int-alg, refer to the algorithm distinguisher definition table in 4G shown in Table 2.

5117. The UE generates an anchor key by itself based on an AK, an IK, an SNT, and an ANT, and then derives by itself a user plane cipher key $K_{UPenc}$, a user plane integrity key $K_{UPint}$, a control plane cipher key $K_{RRCenc}$, and a control plane integrity key $K_{RRCint}$ based on the anchor key.

Figure 17B:
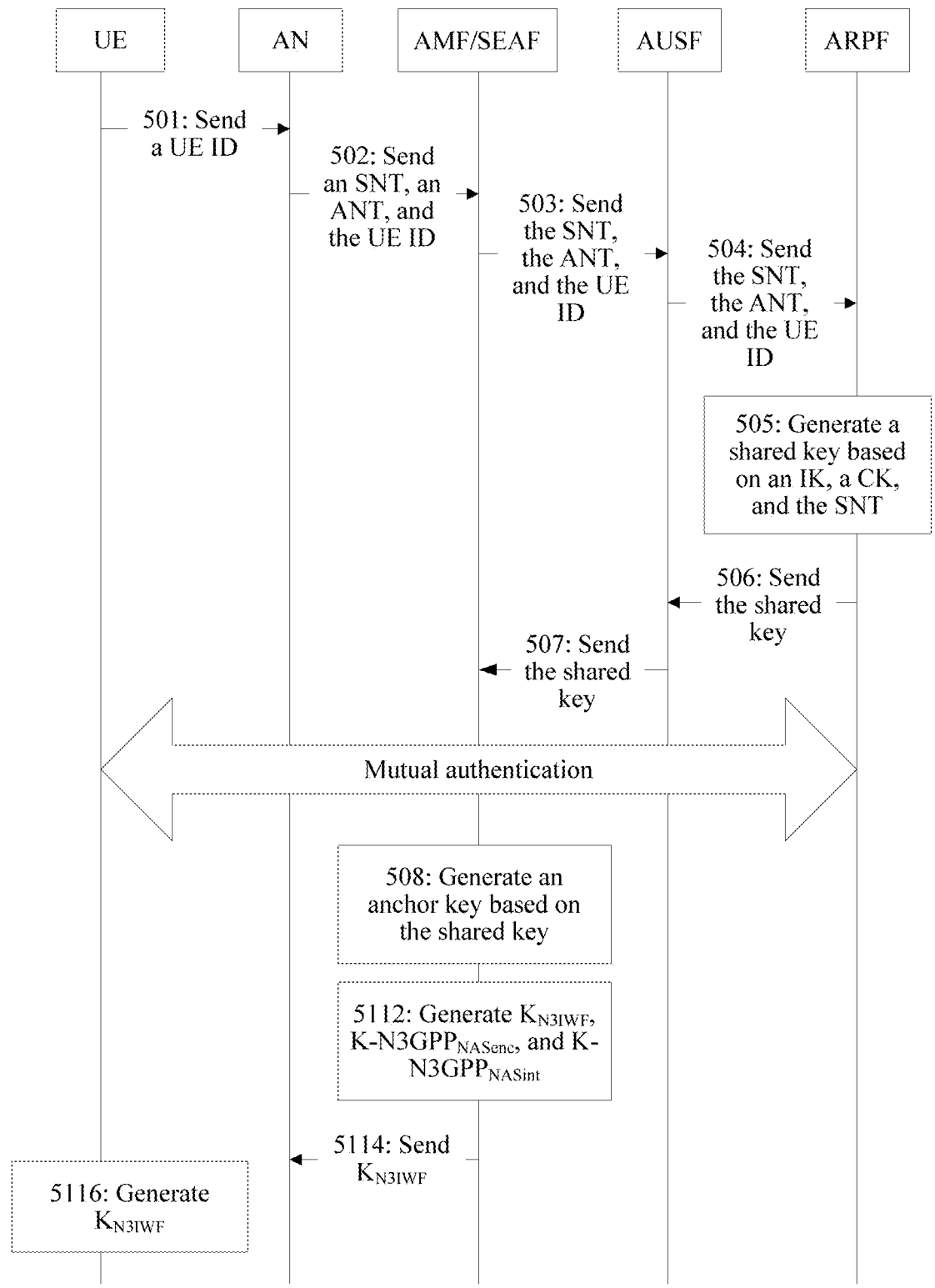

As shown in FIG. 17B, it is assumed that the access mode is the non-3GPP access mode, and the anchor key is an anchor key 2. Then, step 509 to step 511 may be replaced with the following steps S112 to S116.

5112. The AMF (or the SEAF) generates an access point key $K_{N3IWF}$, a non-3GPP-NAS cipher key K-N3GPP$_{NASenc}$, and a non-3GPP-NAS integrity protection key K-N3GPP$_{NASint}$ based on the anchor key 2.

In some embodiments, the AMF (or the SEAF) then generates the access point key $K_{N3IWF}$, the non-3GPP-NAS cipher key K-N3GPP$_{NASenc}$, and the non-3GPP-NAS integrity protection key K-N3GPP$_{NASint}$ in the non-3GPP access mode based on the following formulas:

$$K_{N3IWF}=KDF(\text{anchor key2,NAS Count2});$$

$$K\text{-}N\text{3GPP}_{NASint}=KDF(\text{anchor key2,NAS-int-alg,alg-ID});$$

$$K\text{-}N\text{3GPP}_{NASenc}=KDF(\text{anchor key2,NAS-enc-alg,alg-ID}),$$

where NAS Count2 is a count value of a NAS message passing a non-3GPP access point N3IWF, and may be an uplink count value or may be a downlink count value, NAS-int-alg is an integrity algorithm corresponding to the NAS message, such as 'AES', 'SNOW 3G', or 'ZUC', alg-ID is an algorithm distinguisher, and NAS-enc-alg is an encryption algorithm corresponding to the NAS message, such as 'AES', 'SNOW 3G', or 'ZUC'.

5114. The AMF (or the SEAF) sends the access point key $K_{N3IWF}$ to the AN. In this case, the AN correspondingly receives the access point key $K_{N3IWF}$ sent by the AMF (or the SEAF).

5116. The UE generates by itself an anchor key based on an AK, an IK, an SNT, and an ANT, and then derives by itself an access point key $K_{N3IWF}$ based on the anchor key.

It may be understood that, the key generation algorithm in the embodiment shown in FIG. 16 is not limited to the KDF algorithm. In application, the key generation algorithm may be another algorithm, such as a Trunc algorithm: a Trunc algorithm for truncating least significant bits, or another HASH algorithm. This is not specifically limited in this application. In addition, an independent variable of the key generation algorithm may also include another parameter, such as NSSAI, a random number, a nonce, a sequence number, a registration type, an access stratum message count, a security algorithm distinguisher, a security identifier, a length of SQN⊕AK, or a length corresponding to a parameter used for generating a key. In application, one or more parameters may be selected therefrom based on requirements as independent variables of the key generation algorithm.

Figure 18:
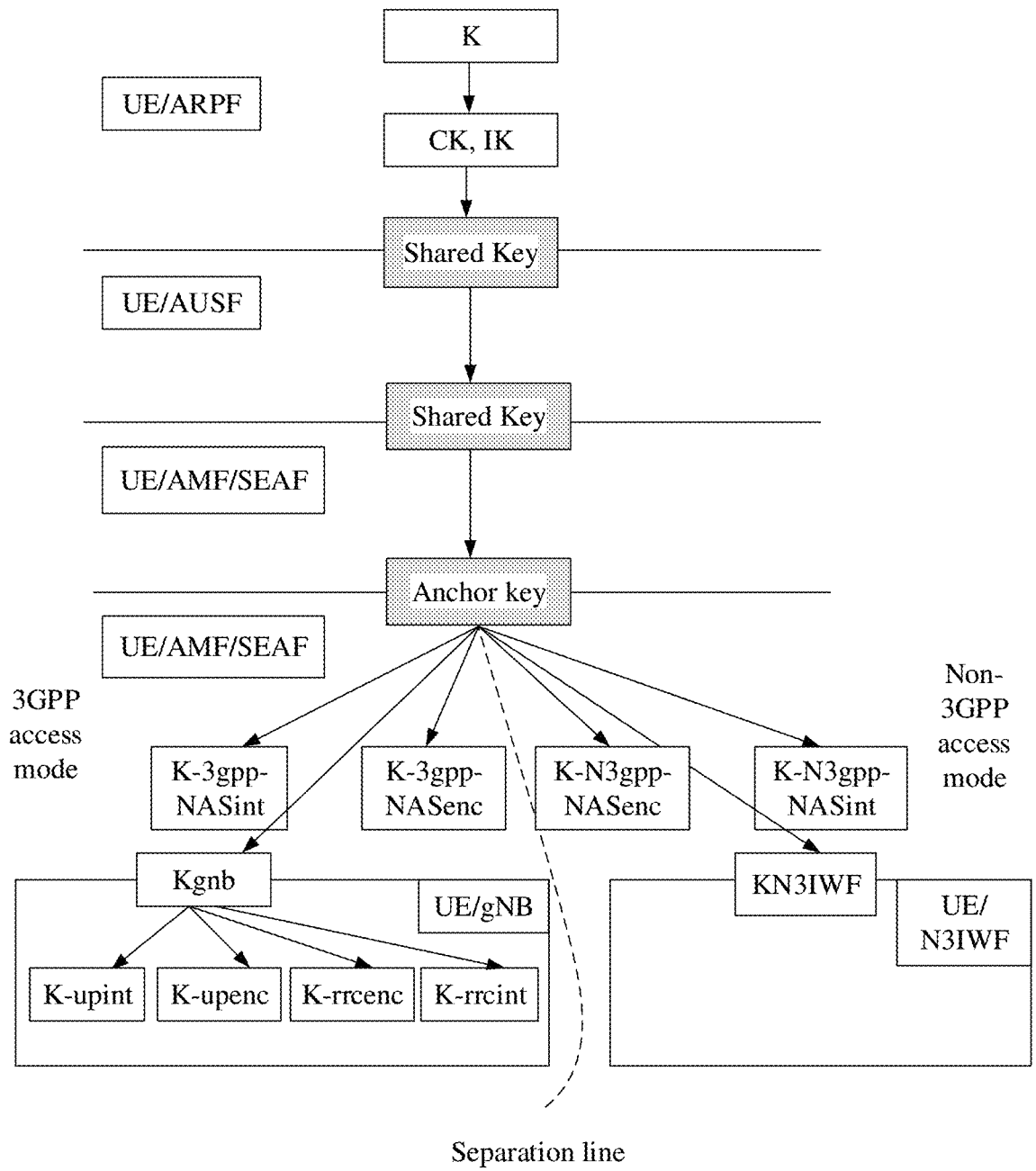
FIG. 18 is a key architectural diagram obtained by using the anchor key generation method shown in FIG. 16.

After the anchor key generation method shown in FIG. 16 is executed, a key architecture shown in FIG. 18 is to be generated. On the left of a separation line in FIG. 18, there is a key architecture generated by performing the process shown in FIG. 17A. On the right of the separation line in FIG. 18, there is a key architecture generated by performing the process shown in FIG. 17B. The two key architectures can be well separated.

Figure 19:
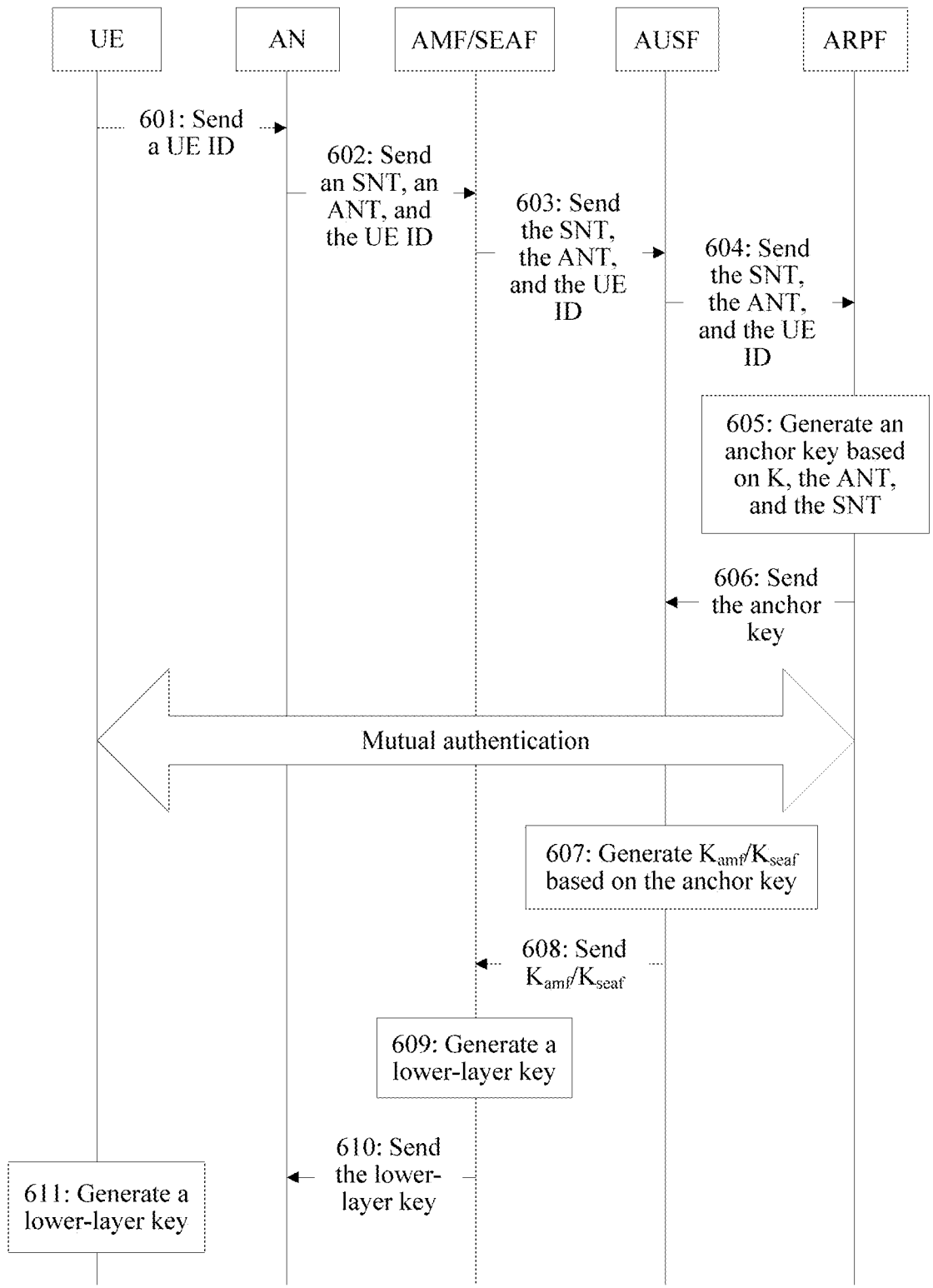
FIG. 19 is an interaction diagram of a seventh anchor key generation method according to an embodiment of this application.

As shown in FIG. 19, an embodiment of this application provides a seventh anchor key generation method. The method may be implemented based on the network architectures shown in FIG. 3 and FIG. 4, and the method includes but is not limited to the following steps.

601. UE sends a terminal identifier to an AN. Correspondingly, the AN receives the terminal identifier sent by the UE.

In this embodiment of this application, the terminal identifier may be a fixed identifier, for example, a media access control (MAC) address, an Internet Protocol (IP) address, a mobile number, an international mobile equipment identity (International Mobile Equipment Identity, IMEI), an international mobile subscriber identity (IMSI), an IP multimedia private identity IMPI, or an IP multimedia public identity (IMPU); or may be a temporarily allocated identifier, for example, a temporary mobile subscriber identity (TMSI) or a globally unique temporary UE identity (GUTI).

It may be understood that, in addition to the terminal identifier, the UE may send, to the AN, at least one of an access network parameter, a registration type, a security parameter, a 5G network capability of the UE, or a PDU session status. The access network parameter may be a parameter related to a service network, such as a frequency of an access network, a temporary user identity, or NSSAI. The registration type may indicate that a user is performing initial registration, registration caused by a movement, a periodic registration update, or the like, in order to distinguish between user registration behaviors. The security parameter is a parameter related to authentication and integrity protection. The NSSAI is short for network slice selection assistance information. The 5G network capability of the UE may include a configuration capability that supports access to the network. The PDU session is a service connection of a PDU between the UE and a data network, and a type of the service connection may be an IP or Ethernet service connection.

602. The AN sends the terminal identifier and an indication identifier to an AMF (or an SEAF). Correspondingly, the AMF (or the SEAF) receives the terminal identifier and the indication identifier sent by the AN.

In this embodiment of this application, the indication identifier is used to indicate an access mode of a terminal. In a 5G standard, the access mode of the terminal may be classified based on different classification bases. For example, the classification bases of the access mode may include an access type and an operator type. The access type may be classified into a 3GPP access type, a trusted non-3GPP access type, and an untrusted non-3GPP access type. The operator type may be classified into an operator type A or an operator type B. It may be understood that there may be more operator types. The operator types are merely examples herein, and are not specifically limited.

For example, the classification bases include an access type and an operator type. Classification of the access mode may be shown in Table 1. It should be noted that the classification bases are not limited to the foregoing two types of classification bases. The classification basis of the access mode may be another type of classification basis, for example, a medium type (wired access or wireless access). This is not specifically limited herein. In addition, the classification bases are not limited to the two classification bases: the access type and the operator type. There may be one, three, four, or more classification bases of the access mode, that is, the access mode may be classified by more dimensions or fewer dimensions.

The indication identifier may be carried in the access network parameter. The indication identifier may include an access type identifier and an operator type identifier, where the access type identifier is used to indicate the access type, and the operator type identifier is used to indicate the operator type. It may be understood that the foregoing example is merely used as an example, and does not constitute a specific limitation.

In some possible implementations, the access type identifier indicates that the access type is a 3GPP access type, a trusted non-3GPP access type, and an untrusted non-3GPP access type. For example, the access type identifier access network type (ANT) may be directly character strings such as "3GPP network", "Trusted Non-3GPP network", and "Untrusted Non-3GPP network", or may be only character strings such as "3GPP network" and "Non-3GPP network".

In some possible implementations, the operator type identifier may include two parts, where one part is used to indicate an operator, and the other part is used to indicate a specific access type. For example, the operator type identifier may indicate LTE access of China Mobile or WLAN access of China Unicom. In application, a combination of the SN Identity and the Access Network Identity may be used as an operator type identifier. Alternatively, the operator type identifier may only indicate an operator, such as China Mobile, China Unicom, and China Telecom.

In some possible implementations, it may be possible that the indication identifier is only an operator type identifier.

In some possible implementations, it may be possible that the indication identifier is only an access type identifier.

603. The AMF (or the SEAF) sends the terminal identifier and the indication identifier to an AUSF. Correspondingly, the AUSF receives the terminal identifier and the indication identifier sent by the AMF (or the SEAF).

604. The AUSF sends the terminal identifier and the indication identifier to an ARPF. Correspondingly, the ARPF receives the terminal identifier and the indication identifier sent by the AUSF.

605. The ARPF generates an anchor key based on a root key K and the indication identifier.

In this embodiment of this application, the ARPF may generate the anchor key based on a key generation algorithm in the following several manners.

In a first manner, when the indication identifier is an NAI, the ARPF generates the anchor key based on the following key generation algorithm: anchor key=KDF(SQN⊕AK, NAI, K), where KDF is the key generation algorithm, SQN is a latest sequence number, NAI is the indication identifier, K is the root key, AK is an anonymity key, AK=f5(RAND), RAND is a random number, f3 is a generation algorithm, ⊕ means an exclusive OR operation.

In a second manner, when the indication identifier includes an access type identifier and an operator type identifier, the ARPF generates the anchor key anchor key based on the following key generation algorithm: anchor key=KDF(SQN⊕AK, ANT, SNT, K), where KDF is the key generation algorithm, SQN is a latest sequence number, ANT is the access type identifier, SNT is the operator type key, AK is an anonymity key, AK=f5(RAND), RAND is a random number, f5 is a generation algorithm, ⊕ means an exclusive OR operation.

In some possible implementations, SQN may be a latest sequence number generated by an AuC, and after generating SQN, the AuC sends SQN to the ARPF. Similarly, RAND may be a random number generated by the AuC, and after generating RAND, the AuC sends RAND to the ARPF. In addition to the foregoing manner, SQN and RAND may also be generated by another communications device in the network architecture and sent to the ARPF. SQN and RAND may be even generated by the ARPF itself. This is not specifically limited herein.

In some possible implementations, AK may be generated by the AuC based on a formula AK=f5(RAND). In addition to the foregoing manner, AK may also be generated by another communications device in the network architecture and sent to the ARPF. AK may be even generated by the ARPF itself. This is not specifically limited herein.

606. The ARPF sends the anchor key to the AUSF. Correspondingly, the AUSF receives the anchor key sent by the ARPF.

607. The AUSF generates a key $K_{amf}$ and/or a key $K_{seaf}$ based on the anchor key.

In this embodiment of this application, the AUSF generates the key $K_{amf}$ and/or the key $K_{seaf}$ based on the following formulas:

$$K_{amf}=KDF(\text{anchor key}, AMF \text{ ID});$$

$$K_{seaf}=KDF(\text{anchor key}, SEAF \text{ ID}),$$

where anchor key is the anchor key, KDF is a key generation algorithm, AMF ID is an identifier of the AMF, and SEAF ID is an identifier of the SEAF.

608. The AUSF sends the key $K_{amf}$/the key $K_{seaf}$ to the AMF/the SEAF. Correspondingly, the AMF/the SEAF receives the key $K_{amf}$/the key $K_{seaf}$ sent by the AUSF.

609. The AMF (or the SEAF) generates a lower-layer key based on the key $K_{amf}$/the key $K_{seaf}$. The lower-layer key is a key obtained by performing one or more times of derivation based on the anchor key.

It may be understood that a process in which the AMF (or the SEAF) generates the lower-layer key based on the key $K_{amf}$/the key $K_{seaf}$ is basically the same as the processes shown in FIG. 12A and FIG. 12B. For details, refer to FIG. 12A and FIG. 12B and related content. Details are not described herein again.

610. The AMF (or the SEAF) sends the lower-layer key to the AN.

611. The UE generates a lower-layer key based on K, an SNT, and an ANT. It may be understood that a process of deriving, by the UE, the lower-layer key is substantially similar to the foregoing process, and details are not described herein again.

It may be understood that after generating the anchor key, the AUSF may also directly send the anchor key to the AMF, and then the AMF generates the lower-layer key based on the anchor key and sends the lower-layer key to the AN.

It may be understood that, the key generation algorithm in the embodiment shown in FIG. 19 is not limited to the KDF algorithm. In application, the key generation algorithm may be another algorithm, such as a Trunc algorithm: a Trunc algorithm for truncating least significant bits, or another HASH algorithm. This is not specifically limited in this application. In addition, an independent variable of the key generation algorithm may also include another parameter, such as NSSAI, a random number, a nonce, a sequence number, a registration type, an access stratum message count, a security algorithm distinguisher, a security identifier, a length of SQN⊕AK, or a length corresponding to a parameter used for generating a key. In application, one or more parameters may be selected therefrom based on requirements as independent variables of the key generation algorithm.

Figure 20:
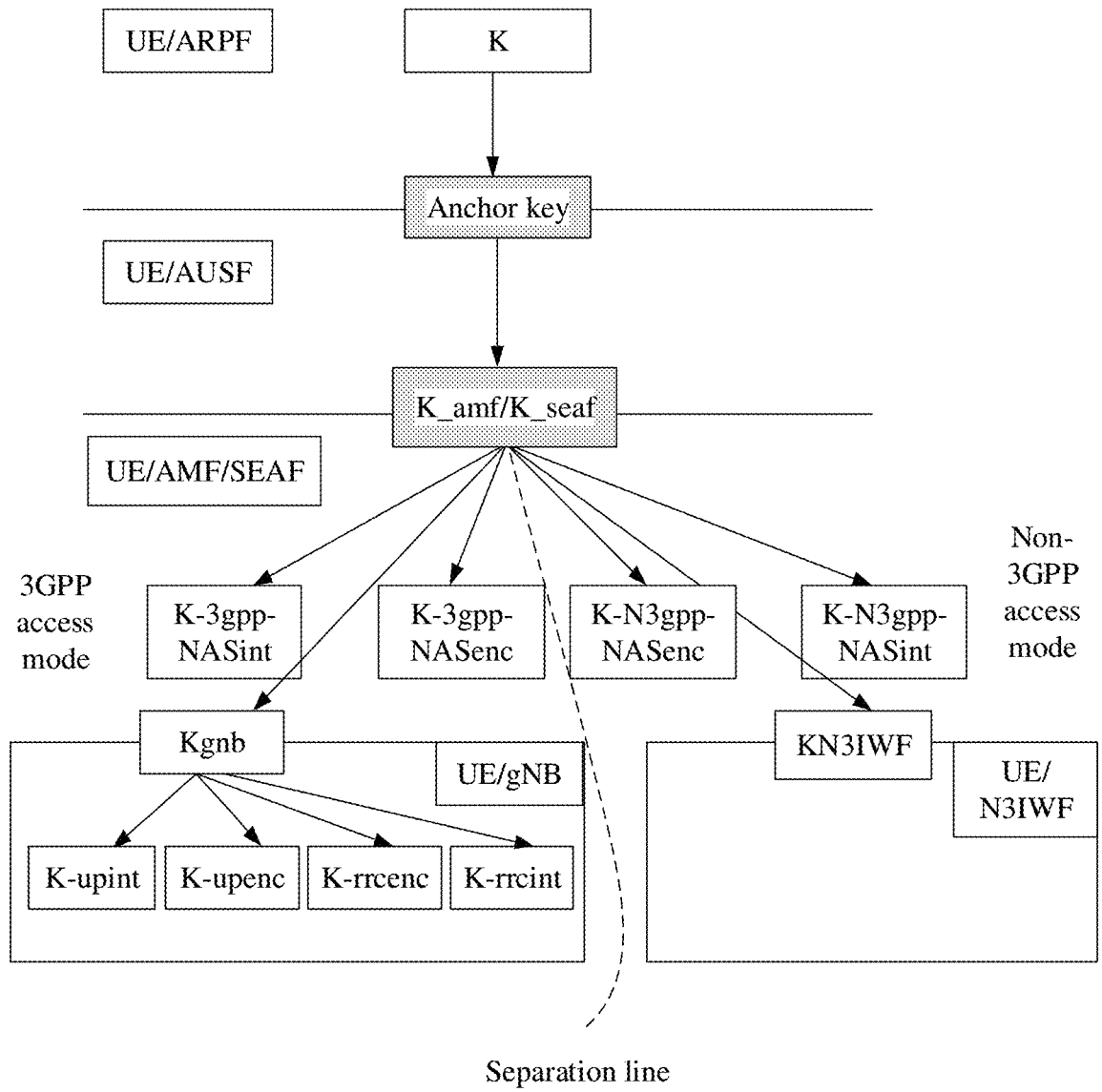
FIG. 20 is a key architectural diagram obtained by using the anchor key generation method shown in FIG. 19.

After the anchor key generation method shown in FIG. 19 is executed, a key architecture shown in FIG. 20 is to be generated. On the left of a separation line in FIG. 20, there is a key architecture generated by performing the process of the 3GPP access mode. On the right of the separation line in FIG. 20, there is a key architecture generated by performing the process of the non-3GPP access mode. The two key architectures can be well separated.

In another embodiment of the present disclosure, an implementation of reserving a key on an AUSF is disclosed. The reserved key may be $K_{left}$ for short.

It should be noted that the AUSF sends an anchor key to a second communications device SEAF, and in a possible deployment scenario, the SEAF is a security network element of a service network, and the AUSF is a security network element of a home network. Especially in a roaming scenario, if authentication occurs between UE and a security network element of the home network, the UE and the AUSF may generate a final protection key based on a reserved key obtained after the authentication, in order to implement end-to-end security protection or higher security protection between the UE and the home network.

It should be noted that the reserved key may be generated by an ARPF, and then sent to the AUSF, or the reserved key may be directly generated by the AUSF.

Method 1: The ARPF may generate the reserved key $K_{left}$ based on a parameter such as an IK, a CK, an SQN, an AK, a service network identifier, a key characteristic identifier, a RAND, or a nonce.

The SQN is a latest sequence number, the CK is an initial cipher key, the IK is an initial integrity key, the AK is an anonymity key, and both the RAND and the Nonce may be considered as random numbers. The key characteristic identifier may be a character string such as KEYLEFT, AUSFKEY, KEYAUSF, KEYSEAF, and SEAFKEY.

A subsequently related generation function KDF may also be a pseudo random function (pseudo random function, PRF), or the like. For details, refer to the definition in Section 3.4.1 in RFC5448.

For example, $K_{left}$=KDF(IK, CK, SQN⊕AK, optional parameter), and KDF is a key generation algorithm.

The optional parameter is one or more of an authentication method name, the service network identifier, the key characteristic identifier, the RAND, or the nonce.

The authentication method name may be an identifier of an identifier authentication method such as 'EAP-AKA'', '5G-EAP', or 'EPS-AKA*'.

For EPS-AKA*, the ARPF may generate $K_{left}$ based on parameters such as $K_{asme*}$, the authentication method name, the service network identifier, a network type identifier, the key characteristic identifier, the RAND, and the nonce.

$K_{asme*}$ is a key similar to $K_{asme}$ in 4G LTE.

For example, $K_{left}$=KDF($K_{asme*}$, first parameter group).

The first parameter group is one or more of the authentication method name, the service network identifier, the network type identifier, the key characteristic identifier, the RAND, or the nonce.

It should be noted that a process of generating the reserved key described in Method 1 may be separately combined with the methods described in FIG. 5, FIG. 8, FIG. 9, FIG. 11A and FIG. 11B, FIG. 13, and FIG. 16.

Method 2: For EAP-AKA', the ARPF may generate $K_{left}$ based on one or more of parameters such as an IK', a CK', the authentication method name, the service network identifier, the key characteristic identifier, an AUSF ID, the RAND, or the nonce.

For example, $K_{left}$=KDF(IK', CK', service network identifier, key characteristic identifier, second parameter group).

The second parameter group is one or more of the authentication method name, the AUSF ID, the RAND, or the nonce.

It should be noted that, alternatively, the ARPF may send the IK' and the CK' to the AUSF, and the AUSF generates the $K_{left}$.

It should be noted that a process of generating the reserved key described in Method 2 may be separately combined with the methods described in FIG. 5, FIG. 8, FIG. 9, and FIG. 11A and FIG. 11B.

Method 3: The AUSF may generate $K_{left}$ based on parameters such as an EMSK and an MSK. The EMSK is short for extended master session key. Refer to RFC5448. The MSK is short for master session key. Refer to RFC5448.

For example, $K_{left}$=trunc (EMSK or MSK). This formula means that some bits of the EMSK or the MSK are directly truncated as $K_{left}$, and trunc is used to truncate a value. For example, trunc(number) indicates truncating a number; trunc(date) indicates truncating a date. Format: TRUNC(n1, n2), where n1 indicates a to-be-truncated number, n2 indicates truncating to which digit, n2 may be a negative number, meaning truncating to a digit on the left of a decimal point. It should be noted that TRUNC truncation is not rounding off.

For example, $K_{left}$=KDF(EMSK or MSK, key characteristic identifier, third parameter group).

The third parameter group is one or more of the service network identifier, the authentication method name, the random number, or the like.

For example, $K_{left}$ may also be understood as the EMSK.

It should be noted that a process of generating the reserved key described in Method 3 may be separately combined with the methods described in FIG. 8, FIG. 9, and FIG. 11A and FIG. 11B.

It may be understood that when $K_{left}$ exists, the anchor key may be a key generated based on $K_{left}$.

For example, the anchor key may be generated based on a parameter such as $K_{left}$, the service network identifier, the key characteristic identifier, the RAND, or the nonce.

In addition, in another embodiment of the present disclosure, step 1114 in FIG. 6B, step 4112 in FIG. 14B, and step S112 in FIG. 17B may be replaced with the following described below.

The AMF (or the SEAF) generates an access point key $K_{N3IWF}$ in a non-3GPP access mode based on parameters such as $K_{amf2}$, $K_{seaf2}$, NAS Count2, a NAS connection differentiation identifier, and an N3IWF identifier.

For example, $K_{N3IWF}$=KDF($K_{amf2}$ and/or $K_{seaf2}$, NAS Count2), where NAS Count2 is a count value of a NAS message passing a non-3GPP access point N3IWF, and may be an uplink count value, or may be a downlink count value. A and/or B represents three possibilities: A, B, or (A and B).

Figure 21:
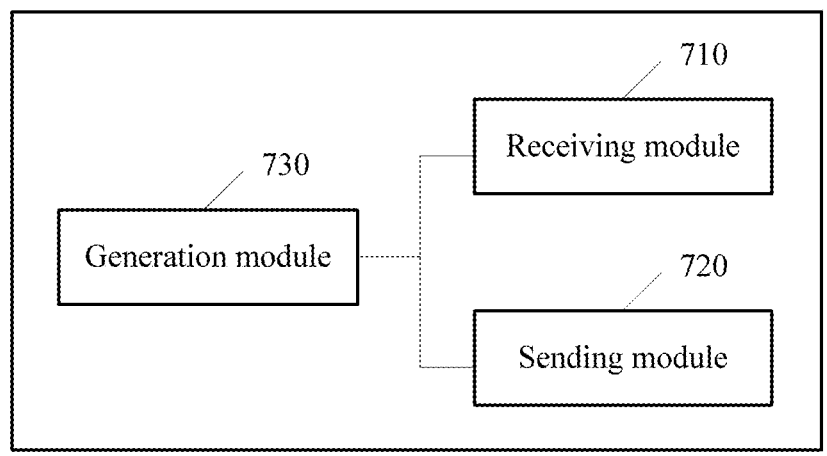
FIG. 21 is a schematic structural diagram of a communications device according to an embodiment of this application.

The formula, $K_{N3IWF}$=KDF($K_{amf2}$ and/or $K_{seaf2}$, NAS Count2), includes three possibilities:

$K_{N3IWF}$=KDF($K_{amf2}$,NAS Count2);     1:

$K_{N3IWF}$=KDF($K_{seaf2}$,NAS Count2);     2:

$K_{N3IWF}$=KDF($K_{amf2}$,$K_{seaf2}$,NAS Count2).     3:

FIG. 21 shows a schematic structural diagram of a communications device. In this implementation, the communications device includes a receiving module 710, a sending module 720, and a generation module 730. The following provides detailed description.

The receiving module 710 is configured to receive an indication identifier sent by a second communications device, where the indication identifier is used to indicate an access mode of a terminal.

The sending module 720 is configured to send the indication identifier to a third communications device.

The receiving module 710 is configured to receive an intermediate key returned by the third communications device, where the intermediate key is generated based on the indication identifier.

The generation module 730 is configured to generate an anchor key based on the intermediate key, where the anchor key is corresponding to the access mode of the terminal.

The sending module 720 is configured to send the anchor key to the second communications device, such that the second communications device derives a lower-layer key for the access mode based on the anchor key.

It should be noted that, for content not mentioned in the embodiment in FIG. 21 and implementations of each function unit, refer to FIG. 5 to FIG. 10 and related content, and details are not described herein again.

Figure 22:
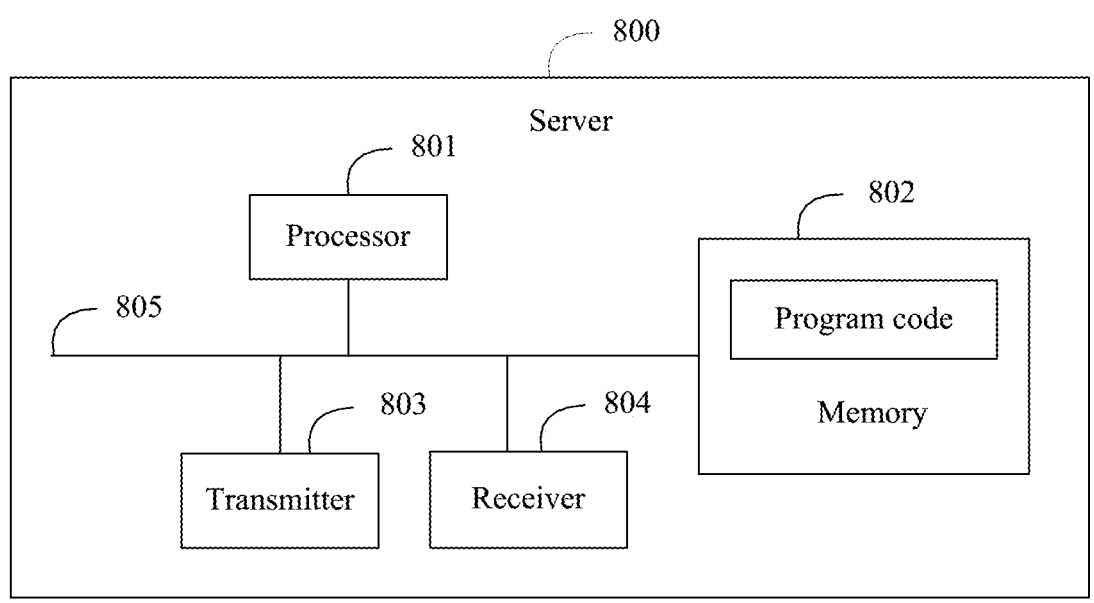
FIG. 22 is a schematic structural diagram of another communications device according to an embodiment of this application.

Based on a similar inventive concept, an embodiment of the present disclosure further provides an apparatus (shown in FIG. 22). The apparatus is configured to implement the methods described in the foregoing embodiments of FIG. 5 to FIG. 12. As shown in FIG. 22, an apparatus 800 includes a transmitter 803, a receiver 804, a memory 802, and a processor 801 coupled to the memory 802 (there may be one or more processors 801, and one processor is used as an example in FIG. 20). The transmitter 803, the receiver 804, the memory 802, and the processor 801 may be connected to each other by using a bus or in another manner (using a bus 805 to implement connection is used as an example in FIG. 22). The transmitter 803 is configured to send data to the outside, and the receiver 804 is configured to receive data from the outside. The memory 802 is configured to store program code, and the processor 801 is configured to invoke and run the program code stored in the memory 802.

The receiver 804 receives an indication identifier sent by a second communications device, where the indication identifier is used to indicate an access mode of a terminal.

The transmitter 803 sends the indication identifier to a third communications device. The receiver 804 receives an intermediate key returned by the third communications device, where the intermediate key is generated based on the indication identifier.

The processor 801 generates an anchor key based on the intermediate key, where the anchor key is corresponding to the access mode of the terminal.

The transmitter 803 sends the anchor key to the second communications device, such that the second communications device derives a lower-layer key for the access mode based on the anchor key.

In some possible implementations, the access mode is distinguished based on at least one of an access type or an operator type.

In some possible implementations, the processor 801 generates the anchor key based on the following formula: anchor key=KDF($IK_1'$||$CK_1'$), where anchor key is the anchor key, ($IK_1'$, $CK_1'$) is the intermediate key, $IK_1'$ is an intermediate integrity key, $CK_1'$ is an intermediate cipher key, and || means concatenation, indicating that characters on both sides of the symbol are connected in series.

The processor 801 may generate the intermediate key based on at least the following two manners.

When the indication identifier includes an access type identifier and an operator type identifier, the intermediate key is generated by the processor 801 based on the following formula: $(CK_1', IK_1')=KDF(SQN \oplus AK, ANT, SNT, CK\|IK)$, where the access type identifier is used to indicate the access type, the operator type identifier is used to indicate the operator type, $(CK_1', IK_1')$ is the intermediate key, $CK_1'$ is the intermediate cipher key, $IK_1'$ is the intermediate integrity key, KDF is a key generation algorithm, SQN is a latest sequence number, ANT is the access type identifier, SNT is the operator type identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

When the indication identifier is an NAI, the intermediate key is generated by the processor 801 based on the following formula: $(CK_1', IK_1')=KDF(SQN \oplus AK, NAI, CK\|IK)$, where $(CK_1', IK_1')$ is the intermediate key, $CK_1'$ is an intermediate cipher key, $IK_1'$ is an intermediate integrity key, KDF is a key generation algorithm, SQN is a latest sequence number, NAI is the indication identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

In some possible implementations, the processor 801 generates the intermediate key based on the following formula: $(CK_2', IK_2')=KDF(SQN \oplus AK, ANT, CK\|IK)$, where $(CK_2', IK_2')$ is the intermediate key, $CK_2'$ is the intermediate cipher key, $IK_2'$ is the intermediate integrity key, KDF is the key generation algorithm, SQN is a latest sequence number, ANT is the access type identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

The processor 801 generates an EMSK' based on the following formula: $EMSK'=PRF'(IK_2'\|CK_2')$, where EMSK' is an extended master session key, $(IK_2', CK_2')$ is the intermediate key, $IK_2'$ is the intermediate integrity key, $CK_2'$ is the intermediate cipher key, and ‖ means concatenation, indicating that characters on both sides of the symbol are connected in series.

The processor 801 generates the anchor key based on the following formula: anchor key=KDF(EMSK', SNT), where anchor key is the anchor key, and SNT is the operator type identifier.

In some possible implementations, the processor 801 generates the intermediate key based on the following formula: $(CK_2', IK_2')=KDF(SQN \oplus AK, SNT, CK\|IK)$, where $(CK_2', IK_2')$ is the intermediate key, $CK_2'$ is the intermediate cipher key, $IK_2'$ is the intermediate integrity key, KDF is the key generation algorithm, SQN is a latest sequence number, SNT is the operator type identifier, CK is an initial cipher key, IK is an initial integrity key, AK is an anonymity key, $CK=f3(RAND)$, $IK=f4(RAND)$, $AK=f5(RAND)$, RAND is a random number, f3, f4, and f5 are generation algorithms, and $\oplus$ means an exclusive OR operation.

The processor 801 generates an EMSK' based on the following formula: $EMSK'=PRF'(IK_2'\|CK_2')$, where EMSK' is an extended master session key, $(IK_2', CK_2')$ is the intermediate key, $IK_2'$ is the intermediate integrity key, $CK_2'$ is the intermediate cipher key, and ‖ means concatenation, indicating that characters on both sides of the symbol are connected in series.

The processor 801 generates the anchor key based on the following formula: anchor key=KDF(EMSK', ANT), where anchor key is the anchor key, and ANT is the access type identifier.

A person skilled in the art should understand that the embodiments of the present disclosure may be provided as a method, a system, or a computer program product. Therefore, embodiments of the present disclosure may be in a form of hardware, software, or with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The embodiments of the present disclosure is described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a manner, such that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for generating an anchor key in a communication system, comprising:
   generating, by a unified data management network element (UDM), an intermediate key based on a cipher key (CK), an integrity key (IK), and indication information regarding an operator;
   sending, by the UDM, the intermediate key to an authentication server function (AUSF);

receiving, by the AUSF, the intermediate key;
generating, by the AUSF, the anchor key based on the intermediate key;
sending, by the AUSF, the anchor key to a security anchor function (SEAF); and
generating, by the SEAF, a key (Kamf) based on the anchor key, wherein the Kamf is used to derive a $3^{rd}$ Generation Partnership Project (3GPP) key,
wherein generating, by the AUSF, the anchor key based on the intermediate key comprises:
   generating, by the AUSF, an extended master session key (EMSK') based on the intermediate key;
   generating, by the AUSF, a key ($K_{left}$) by truncating a bit of the EMSK'; and
   obtaining, by the AUSF, the anchor key based on the $K_{left}$ and a service network identifier.

2. The method according to claim 1, further comprising:
receiving, by the AUSF, the indication information from the SEAF; and
sending, by the AUSF, the indication information to the UDM.

3. The method according to claim 1, wherein the indication information is configured to indicate the operator.

4. The method according to claim 1, wherein the indication information comprises an access network identity and a serving network identity.

5. The method according to claim 1, wherein the indication information indicates a serving network name.

6. The method according to claim 1, wherein the 3GPP key comprises a non-access stratum (NAS) integrity protection key used to perform integrity protection on a NAS message.

7. The method according to claim 1, further comprising generating, by the UDM, the CK and the IK based on a root key.

8. A communication system, comprising:
a unified data management network element (UDM);
an authentication server function (AUSF) coupled to the UDM; and
a security anchor function (SEAF) coupled to the AUSF,
wherein the UDM is configured to generate an intermediate key based on a cipher key (CK), an integrity key (IK), and indication information regarding an operator, and send the intermediate key to the AUSF,
wherein the AUSF is configured to:
   receive the intermediate key;
   generate an extended master session key (EMSK') based on the intermediate key;
   generate a key ($K_{left}$) by truncating a bit of the EMSK';
   obtain an anchor key based on the $K_{left}$ and a service network identifier; and
   send the anchor key to the SEAF,
wherein the SEAF is configured to generate a key (Kamf) based on the anchor key, and wherein the Kamf is used to derive a $3^{rd}$ Generation Partnership Project (3GPP) key.

9. The communication system according to claim 8, wherein the AUSF is further configured to receive the indication information from the SEAF and send the indication information to the UDM.

10. The communication system according to claim 8, wherein the indication information comprises an access network identity and a serving network identity.

11. The communication system according to claim 8, wherein the indication information is an operator type identifier.

12. The communication system according to claim 8, wherein the indication information indicates a serving network name.

13. The communication system according to claim 8, wherein the 3GPP key comprises a non-access stratum (NAS) integrity protection key used to perform integrity protection on a NAS message.

14. The communication system according to claim 8, wherein the UDM is further configured to generate the CK and the IK based on a root key.

15. A method for generating an anchor key in a communication system, comprising:
receiving, by an authentication server function (AUSF), indication information regarding an operator from a security anchor function (SEAF);
sending, by the AUSF, the indication information to a unified data management network element (UDM);
receiving, by the AUSF, an intermediate key from the UDM, wherein the intermediate key is generated based on a cipher key (CK), an integrity key (IK), and the indication information regarding the operator; and
generating, by the AUSF, the anchor key based on the intermediate key, wherein the anchor key is used to derive a $3^{rd}$ Generation Partnership Project (3GPP) key,
wherein generating, by the AUSF, the anchor key based on the intermediate key comprises:
   generating, by the AUSF, an extended master session key (EMSK') based on the intermediate key;
   generating, by the AUSF, a key ($K_{left}$) by truncating a bit of the EMSK'; and
   obtaining, by the AUSF, the anchor key based on the $K_{left}$ and a service network identifier.

16. The method according to claim 15, wherein the 3GPP key comprises a non-access stratum (NAS) integrity protection key used to perform integrity protection on a NAS message.

17. The method according to claim 15, wherein the indication information comprises an access network identity and a serving network identity.

18. An apparatus, comprising:
a processor coupled to a transmitter and a receiver; and
a memory storing computer program instructions which, when executed by the processor, cause the apparatus to:
   receive, via the receiver, indication information regarding an operator from a security anchor function (SEAF);
   send, via the transmitter, the indication information to a unified data management network element (UDM);
   receive, via the receiver, an intermediate key from the UDM, wherein the intermediate key is generated based on a cipher key (CK), an integrity key (IK), and the indication information regarding the operator; and
   generate an anchor key based on the intermediate key, wherein the anchor key is used to derive a $3^{rd}$ Generation Partnership Project (3GPP) key wherein generating anchor key based on the intermediate key comprises:
      generating an extended master session key (EMSK') based on the intermediate key;
      generating a key ($K_{left}$) by truncating a bit of the EMSK'; and
      obtaining the anchor key based on the $K_{left}$ and a service network identifier.

19. The apparatus according to claim 18, wherein the 3GPP key comprises a non-access stratum (NAS) integrity protection key used to perform integrity protection on a NAS message.

20. The apparatus according to claim 18, wherein the indication information comprises an access network identity and a serving network identity.

* * * * *